(12) United States Patent
Tanaka et al.

(10) Patent No.: US 6,782,192 B1
(45) Date of Patent: Aug. 24, 2004

(54) RECORDING MEDIUM APPARATUS AND METHOD RELATED TO INFORMATION REPRESENTING TUNES

(75) Inventors: Yoshiaki Tanaka, Fujisawa (JP); Shoji Ueno, Fujisawa (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/521,774

(22) Filed: Mar. 9, 2000

(30) Foreign Application Priority Data

Apr. 20, 1999 (JP) ............................................ 11-111755
Dec. 28, 1999 (JP) ............................................ 11-372722

(51) Int. Cl.[7] .............................. H04N 5/85; H04N 7/04; H04N 7/52
(52) U.S. Cl. ............................ 386/125; 386/105; 386/96
(58) Field of Search ................................. 386/125, 124, 386/126, 45, 96, 104, 105, 106, 40, 39, 54, 75, 82; H04N 5/85, 7/04, 7/52

(56) References Cited

U.S. PATENT DOCUMENTS 6,567,609 B2 * 5/2003 Mori et al. ..................... 386/98
6,640,045 B2 * 10/2003 Otomo et al. .................. 386/95

FOREIGN PATENT DOCUMENTS

JP 11-7722 * 1/1999
JP 11-25596 1/1999

OTHER PUBLICATIONS

U.S. patent application Ser. No. 09/195,100, filed Nov. 18, 1998.
U.S. patent application Ser. No. 09/197,171, filed Nov. 20, 1998.

* cited by examiner

Primary Examiner—Robert Chevalier
(74) Attorney, Agent, or Firm—Louis Woo

(57) ABSTRACT

An information recording medium includes a recording area for an auxiliary signal, and a recording area for a main signal. The auxiliary-signal recording area and the main-signal recording area are successively arranged. The main-signal recording area stores first information, second information, and third information. The first information represents plural tunes. The second information includes playback control information for separating the tunes into groups and implementing playback of the tunes group by group. The third information includes interactive data for permitting an access to the first information of the tunes group by group.

8 Claims, 19 Drawing Sheets

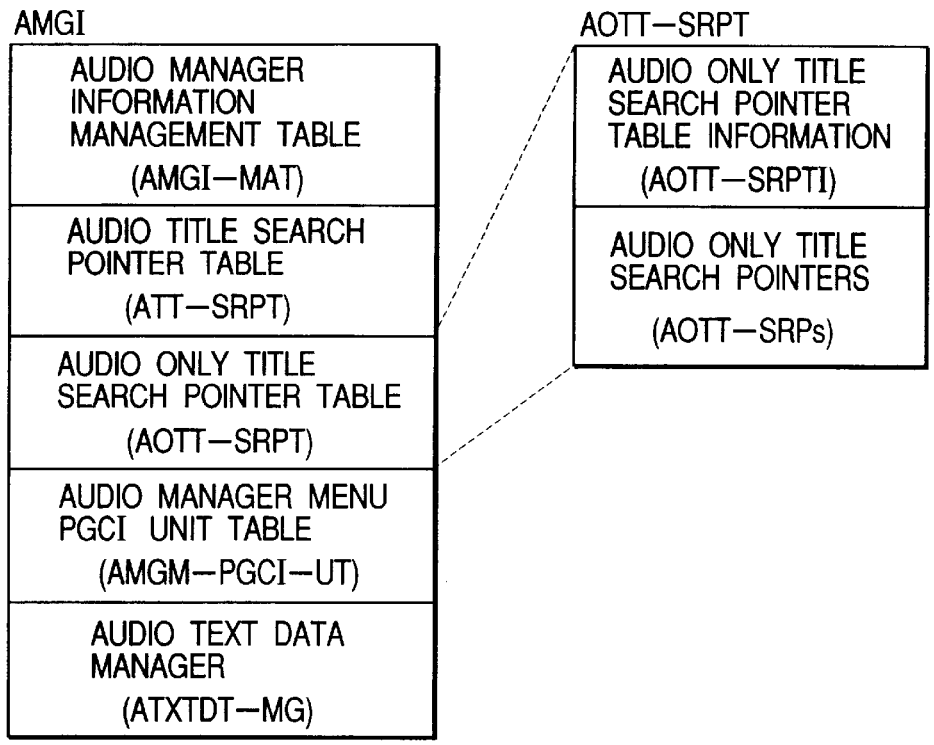

FIG. 4

AOTT—SRP (12 BYTES)

| ATT—CAT | AUDIO TITLE CATEGORY | 1 BYTE |
|---|---|---|
| AOTT—PG—Ns | NUMBER OF PROGRAMS IN AOTT | 1 BYTE |
| AOTT—PB—TM | AOTT TOTAL PLAYBACK TIME | 4 BYTES |
| ATSN | ATS NUMBER | 1 BYTE |
| ATS—TTN | ATS TITLE NUMBER | 1 BYTE |
| ATS—SA | ATS START ADDRESS | 4 BYTES |

FIG. 5

ATT—CAT (1 BYTE)

| b7 | b6　　b5　　b4 | b3　　b2　　b1　　b0 |
|---|---|---|
| PRESENCE/ ABSENCE OF AOTT | RESERVED | AOTT—GRN |

ATS—PGC—GI

| RBP | | BYTE NUMBER |
|---|---|---|
| 0~3 | ATS—PGC CONTENTS (ATS—PGC—CNT) | 4 |
| 4~7 | ATS—PGC PLAYBACK TIME (ATS—PGC—PB—TM) | 4 |
| 8~9 | RESERVED | 2 |
| 10~11 | ATS—PGIT START ADDRESS | 2 |
| 12~13 | ATS—C—PBIT START ADDRESS | 2 |
| 14~15 | RESERVED | 2 |

FIG. 13

ATS—PGI

| RBP | | BYTE NUMBER |
|---|---|---|
| 0~3 | ATS—PG CONTENTS (ATS—PG—CNT) | 4 |
| 4 | ATS—PG ENTRY CELL NUMBER | 1 |
| 5 | RESERVED | 1 |
| 6~9 | FAC—S—PTM | 4 |
| 10~13 | ATS—PG PLAYBACK TIME | 4 |
| 14~17 | ATS—PG PAUSE TIME | 4 |
| 18 | RESERVED (COPYRIGHT MANAGEMENT DATA CMI) | 1 |
| 19 | RESERVED | 1 |

FIG. 14

ATS—PGCI

| ATS—PGC—GI |
|---|
| ATS—PGIT |
| ATS—C—PBIT |

ATS—C—PBIT

| ATS CELL PLAYBACK INFORMATION #1 (ATS—C—PBI#1) |
|---|
| ATS—C—PBI#1 |
| ⋮ |
| ATS—C—PBI#n |

ATS—C—PBI

| RBP | | BYTE NUMBER |
|---|---|---|
| 0 | ATS—C INDEX NUMBER | 1 |
| 1 | ATS—C TYPE (ATS—C—TY) | 1 |
| 2~3 | RESERVED | 2 |
| 4~7 | ATS—C START ADDRESS | 4 |
| 8~11 | ATS—C—END ADDRESS | 4 |

RECORDING MEDIUM APPARATUS AND METHOD RELATED TO INFORMATION REPRESENTING TUNES

BACKGROUND OF THE INVENTION

1. Field of the Invention

This invention relates to a recording medium, an apparatus and a method concerning information representing tunes. Also, this invention relates to a transmission medium concerning information representing tunes.

2. Description of the Related Art

Japanese published unexamined patent application 11-7722 discloses a DVD-Audio on which main information, bonus information, and interactive data are recorded. Here, DVD is short for a digital video disc or a digital versatile disc. The main information represents tunes. The bonus information relates to the tunes. The interactive data are designed to allow an access to the bonus information. The interactive data represent a password. Japanese application 11-7722 also discloses a player for such a DVD-Audio. In the player of Japanese application 11-7722, the reproduction of bonus information is permitted when correct interactive data are inputted by a user.

Japanese application 11-7722 further discloses a DVD-Audio on which main information pieces, control data, and original interactive data pieces are recorded. The main information pieces represent tunes respectively. The control data represent a program for separating the main information pieces into groups and reproducing the main information pieces group by group. The original interactive data pieces are assigned to the groups respectively. Each of the original interactive data pieces is designed to allow an access to the main information piece or pieces in the related group. The interactive data pieces represent passwords respectively. Japanese application 11-7722 also discloses a player for such a DVD-Audio. In the player of Japanese application 11-7722, when an interactive data piece inputted by a user is equal to one of original interactive data pieces, the reproduction of a main information piece or pieces in a group corresponding to the present original interactive data piece is permitted.

SUMMARY OF THE INVENTION

It is a first object of this invention to provide an improved information recording medium.

It is a second object of this invention to provide an improved information transmitting apparatus.

It is a third object of this invention to provide an improved information reproducing apparatus.

It is a fourth object of this invention to provide an improved method of transmitting information.

It is a fifth object of this invention to provide an improved information transmitting medium.

A first aspect of this invention provides an information recording medium comprising a recording area for an auxiliary signal, and a recording area for a main signal, the auxiliary-signal recording area and the main-signal recording area being successively arranged, the main-signal recording area storing first information, second information, and third information, the first information representing plural tunes, the second information including playback control information for separating the tunes into groups and implementing playback of the tunes group by group, the third information including interactive data for permitting an access to the first information of the tunes group by group.

A second aspect of this invention is based on the first aspect thereof, and provides an information recording medium comprising a DVD wherein a total number of the groups is in a range from 2 to 9.

A third aspect of this invention provides an apparatus for transmitting data via a communication medium, the data being of a structure for record on an information recording medium comprising a recording area for an auxiliary signal, and a recording area for a main signal, the auxiliary-signal recording area and the main-signal recording area being successively arranged, the main-signal recording area storing first information, second information, and third information, the first information representing plural tunes, the second information including playback control information for separating the tunes into groups and implementing playback of the tunes group by group, the third information including interactive data for permitting an access to the first information of the tunes group by group.

A fourth aspect of this invention provides an apparatus for reproducing information from an information recording medium storing first information, second information, and third information, the first information representing plural tunes, the second information including playback control information for separating the tunes into groups and implementing playback of the tunes group by group, the third information including original interactive data for permitting an access to a portion of the first information which represents a tune or tunes in at least one of the groups. The apparatus comprises means for receiving input interactive data; means for deciding whether or not the input interactive data are equal to the original interactive data; and means for, when it is decided that the input interactive data are equal to the original interactive data, reproducing said portion of the first information and executing playback of the tune or tunes in said at least one of the groups in response to the playback control information.

A fifth aspect of this invention provides a recording medium storing a signal representative of a computer program for reproducing information from the information recording medium of the first aspect of this invention. The computer program comprises the steps of receiving input interactive data; deciding whether or not the input interactive data are equal to the original interactive data; and when it is decided that the input interactive data are equal to the original interactive data, reproducing said portion of the first information and executing playback of the tune or tunes in said at least one of the groups in response to the playback control information.

A sixth aspect of this invention provides a method of transmitting a signal via a communication medium, the signal being of a predetermined communication format and representing a computer program for reproducing information from the information recording medium of the first aspect of this invention. The computer program comprises the steps of receiving input interactive data; deciding whether or not the input interactive data are equal to the original interactive data; and when it is decided that the input interactive data are equal to the original interactive data, reproducing said portion of the first information and executing playback of the tune or tunes in said at least one of the groups in response to the playback control information.

A seventh aspect of this invention provides an apparatus for transmitting a signal via a communication medium, the signal being of a predetermined communication format and representing a computer program for reproducing information from the information recording medium of the first aspect of this invention. The computer program comprises the steps of receiving input interactive data; deciding whether or not the input interactive data are equal to the original interactive data; and when it is decided that the input interactive data are equal to the original interactive data, reproducing said portion of the first information and executing playback of the tune or tunes in said at least one of the groups in response to the playback control information.

An eighth aspect of this invention provides a medium for transmitting a signal of a predetermined communication format, the signal representing a computer program for reproducing information from the information recording medium of the first aspect of this invention. The computer program comprises the steps of receiving input interactive data; deciding whether or not the input interactive data are equal to the original interactive data; and when it is decided that the input interactive data are equal to the original interactive data, reproducing said portion of the first information and executing playback of the tune or tunes in said at least one of the groups in response to the playback control information.

A ninth aspect of this invention is based on the first aspect thereof, and provides an information recording medium wherein the interactive data comprise a signal representing audio title categories for detecting identification numbers of the respective groups, and a signal representing audio title numbers for determining a reproduction sequence in each of the groups.

A tenth aspect of this invention is based on the first aspect thereof, and provides an information recording medium which stores a signal representing menus of the respective groups.

An eleventh aspect of this invention provides an apparatus for reproducing information from an information recording medium storing first information, second information, third information, and fourth information, the first information representing plural tunes, the second information including playback control information for separating the tunes into groups and implementing playback of the tunes group by group, the third information including original interactive data for permitting an access to the first information of the tunes group by group, the fourth information representing menus of the respective groups. The apparatus comprises means for receiving input interactive data; means for accessing the first information of the tunes group by group in response to the input interactive data and the original interactive data; means for reproducing the fourth information representing the menus of the respective groups; and means for indicating at least one of the menus.

A twelfth aspect of this invention is based on the first aspect thereof, and provides an information recording medium wherein the groups comprise a group of normal tunes and a group of bonus tunes, and the interactive data comprise a signal indicative of an original password for permitting an access to a portion of the first information which represents the bonus tunes.

A thirteenth aspect of this invention provides an apparatus for reproducing information from the information recording medium of the twelfth aspect of this invention. The apparatus comprises means for unconditionally implementing playback of the normal tunes; and means for, in cases where an input password equal to the original password is fed, permitting playback of the bonus tunes.

A fourteenth aspect of this invention provides an information recording medium comprising a recording area for an auxiliary signal, and a recording area for a main signal, the auxiliary-signal recording area and the main-signal recording area being successively arranged, the main-signal recording area storing first information, second information, third information, fourth information, and fifth information, the first information representing a first group of audio titles containing normal tunes, the second information representing a second group of audio titles containing bonus information, the third information containing original interactive data for permitting an access to the bonus information, the fourth information representing pointers for searches for the audio titles, the fifth information representing audio title categories indicating which of the first and second groups the respective audio titles belong to.

A fifteenth aspect of this invention is based on the fourteenth aspect thereof, and provides an information recording medium comprising a DVD.

A sixteenth aspect of this invention provides an apparatus for reproducing information from the information recording medium of the fourteenth aspect of this invention. The apparatus comprises means for receiving input interactive data; means for implementing playback of the normal tunes independent of the input interactive data; means for deciding whether or not the input interactive data are equal to the original interactive data; and means for, when it is decided that the input interactive data are equal to the original interactive data, accessing the audio titles in the second group in response to the pointers and the audio title categories and implementing playback of the bonus information.

A seventeenth aspect of this invention is based on the sixteenth aspect thereof, and provides an apparatus wherein the original interactive data indicates an original password, and the input interactive data indicates an input password.

An eighteenth aspect of this invention provides an apparatus for transmitting data via a communication medium, the data being of a structure for record on an information recording medium comprising a recording area for an auxiliary signal, and a recording area for a main signal, the auxiliary-signal recording area and the main-signal recording area being successively arranged, the main-signal recording area storing first information, second information, third information, fourth information, and fifth information, the first information representing a first group of audio titles containing normal tunes, the second information representing a second group of audio titles containing bonus information, the third information containing original interactive data for permitting an access to the bonus information, the fourth information representing pointers for searches for the audio titles, the fifth information representing audio title categories indicating which of the first and second groups the respective audio titles belong to.

A nineteenth aspect of this invention provides a recording medium storing a signal representative of a computer program for reproducing information from the information recording medium of the fourteenth aspect of this invention. The computer program comprises the steps of receiving input interactive data; implementing playback of the normal tunes independent of the input interactive data; deciding whether or not the input interactive data are equal to the original interactive data; and when it is decided that the input interactive data are equal to the original interactive data, accessing the audio titles in the second group in response to the pointers and the audio title categories and implementing playback of the bonus information.

A twentieth aspect of this invention provides a method of transmitting a signal via a communication medium, the signal being of a predetermined communication format and representing a computer program for reproducing information from the information recording medium of the fourteenth aspect of this invention. The computer program comprises the steps of receiving input interactive data; implementing playback of the normal tunes independent of the input interactive data; deciding whether or not the input interactive data are equal to the original interactive data; and when it is decided that the input interactive data are equal to the original interactive data, accessing the audio titles in the second group in response to the pointers and the audio title categories and implementing playback of the bonus information.

A twenty-first aspect of this invention provides an apparatus for transmitting a signal via a communication medium, the signal being of a predetermined communication format and representing a computer program for reproducing information from the information recording medium of the fourteenth aspect of this invention. The computer program comprises the steps of receiving input interactive data; implementing playback of the normal tunes independent of the input interactive data; deciding whether or not the input interactive data are equal to the original interactive data; and when it is decided that the input interactive data are equal to the original interactive data, accessing the audio titles in the second group in response to the pointers and the audio title categories and implementing playback of the bonus information.

A twenty-second aspect of this invention provides a medium for transmitting a signal of a predetermined communication format, the signal representing a computer program for reproducing information from the information recording medium of the fourteenth aspect of this invention. The computer program comprises the steps of receiving input interactive data; implementing playback of the normal tunes independent of the input interactive data; deciding whether or not the input interactive data are equal to the original interactive data; and when it is decided that the input interactive data are equal to the original interactive data, accessing the audio titles in the second group in response to the pointers and the audio title categories and implementing playback of the bonus information.

BRIEF DESCRIPTION OF THE DRAWINGS

FIG. 2 is a diagram of the structure of an AMGI area in FIG. 1.

FIG. 3 is a diagram of the structure of an AOTT-SRPTI area in FIG. 2.

FIG. 4 is a diagram of the structure of an AOTT-SRP area in FIG. 2.

FIG. 5 is a diagram of the structure of an ATT-CAT area in FIG. 4.

FIG. 13 is a diagram of the structure of an ATS-PGI area in FIG. 12.

FIG. 14 is a diagram of the structure of an ATS-C-PBIT area in FIG. 10.

DESCRIPTION OF THE PREFERRED EMBODIMENTS

First Embodiment

Figure 1:
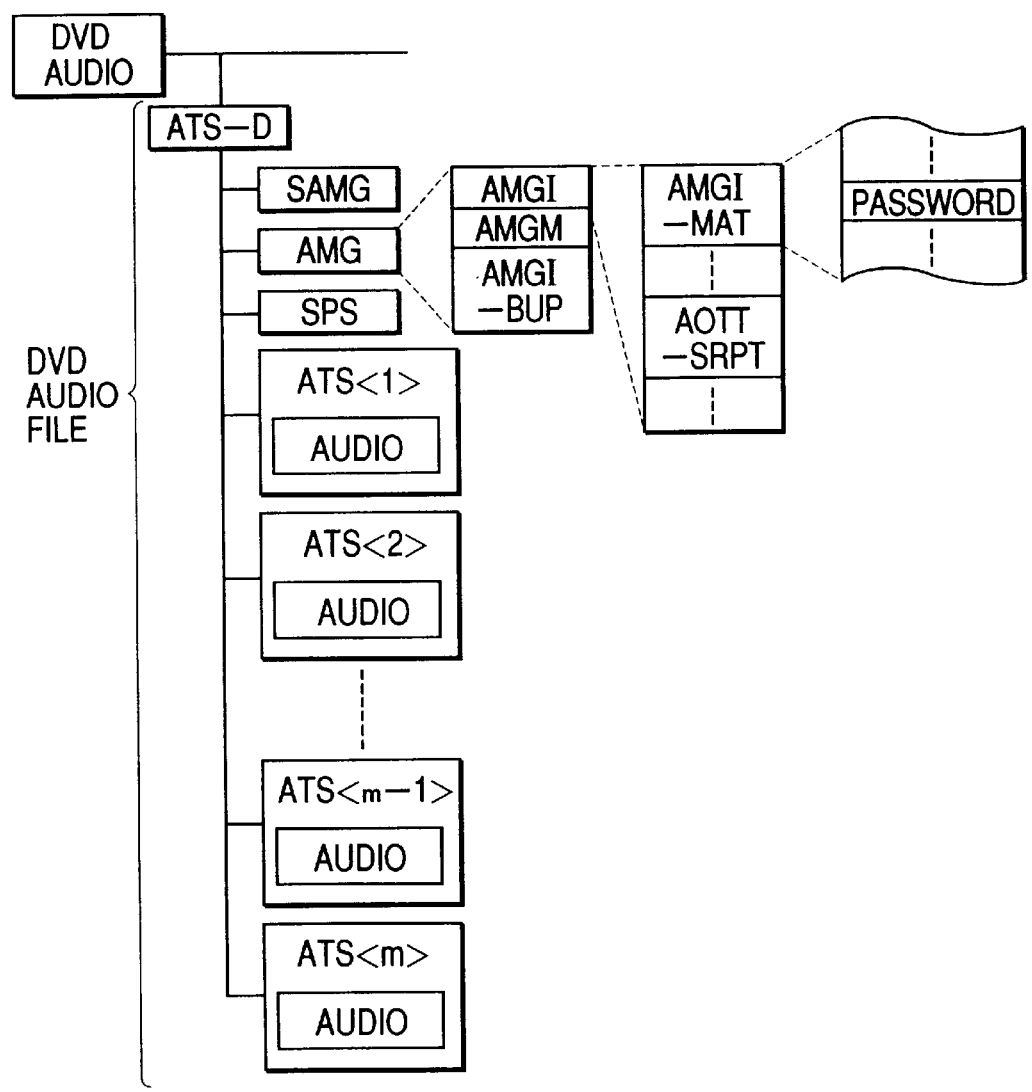
FIG. 1 is a diagram of the signal recording format of a DVD-Audio according to a first embodiment of this invention.

FIG. 1 shows the signal recording format of a DVD-Audio (digital video disc-audio or digital versatile disc-audio) according to a first embodiment of this invention. The DVD-Audio is in a DVD family.

The DVD-Audio in FIG. 1 has an area assigned to a DVD-Audio file which is an audio title set directory ATS-D including a number of audio title sets ATS each composed of audio titles ATT.

Figure 26:
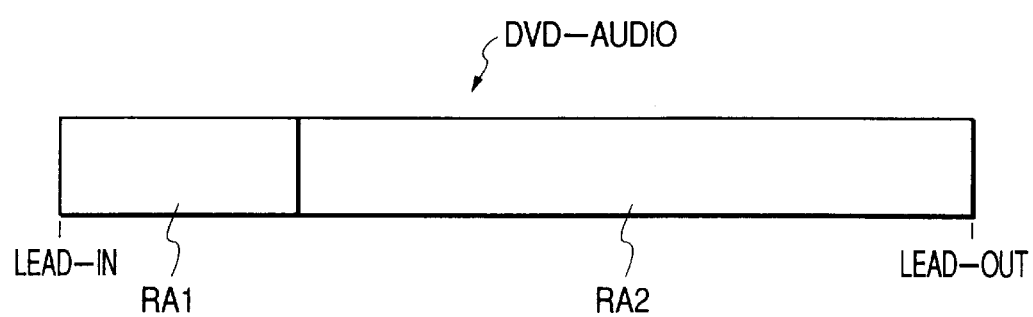
FIG. 26 is a diagram of the DVD-Audio in the first embodiment of this invention.

As shown in FIG. 26, the DVD-Audio has a first recording area RA1 and a second recording area RA2. The first recording area RA1 and the second recording area RA2 are successively arranged in the region from the lead-in position to the lead-out position on the DVD-Audio. Preferably, the first recording area RA1 is in a lead-in area of the DVD-Audio. The first recording area RA1 is used for storing an auxiliary signal while the second recording area RA2 is used for storing a main signal representing the DVD-Audio file (see FIG. 1).

As shown in FIG. 1, the ATS-D area has an area assigned to a structure of simple audio manager which is denoted by SAMG, an area assigned to an audio manager AMG, an area assigned to a still picture set SPS, and areas assigned to respective audio title sets ATS<1>, ATS<2>, . . . , ATS<m−1>, and ATS<m>. Here, "m" denotes a given natural number equal to or greater than 2. The natural number "m" may be equal to 1.

A SAPP table containing TOC information is repetitively recorded on the structure-of-simple audio manager SAMG eight times to enable a search for the heads of the audio title sets ATS<1>, ATS<2>, ..., ATS<m−1>, and ATS<m>. The structure-of-simple audio manager SAMG is defined as an independent file.

The audio manager AMG contains audio manager information AMGI, information representative of an audio manager menu AMGM, and backup audio manager information AMGI-BUP. The audio manager information AMGI is designed for managing the audio title sets ATS<1>, ATS<2>, ..., ATS<m−1>, and ATS<m>. The audio manager information AMGI contains playback control information. The audio manger menu AMGM includes a menu of normal tunes (non-bonus tunes) and a menu of bonus tunes. The menu of bonus tunes is also referred to as the menu of bonus information.

With reference to FIGS. 1 and 2, each of the audio manager information AMGI and the backup audio manager information AMGI-BUP contains an audio manager information table AMGI-MAT. The audio manager information table AMGI-MAT includes interactive data representing a password (an original password) for permitting an access to bonus information usually representing bonus tunes. The password has, for example, a sequence of four numerals or four characters. An example of the setting of the password is as follows. The password being "0000" indicates the absence of bonus information. The password differing from "0000" indicates the presence of bonus information, and corresponds to an effective password.

With reference to FIG. 1, the still picture set SPS contains data representing still pictures. The audio title sets ATS<1>, ATS<2>, ..., ATS<m−1>, and ATS<m>contain audio data representative of main tunes (also referred to as normal tunes or non-bonus tunes), audio data representative of bonus tunes, and non-audio data. The bonus tunes are, for example, karaoke tunes or background music tunes. The non-audio data represent, for example, karaoke subtitles, MIDI code words, and quizzes. The structure of the audio title sets ATS<1>, ATS<2>, ..., ATS<m−1>, and ATS<m>can be freely set by a disc manufacturer. The audio data representative of the non-bonus tunes and the audio data representative of the bonus tunes can be arbitrarily placed in the audio title sets ATS<1>, ATS<2>, ..., ATS<m−1>, and ATS<m>.

As shown in FIG. 2, the audio manager information AMGI (see FIG. 1) has a management table AMGI-MAT therefor, an audio title search pointer table ATT-SRPT, an audio only title search pointer table AOTT-SRPT, an audio manager menu program chain information unit table AMGM-PGCI-UT, and an audio text data manager ATXTDT-MG.

The audio only title search pointer table AOTT-SRPT has an audio only title search pointer table information AOTT-SRPTI, and a plurality of audio only title search pointers AOTT-SRPs.

As shown in FIG. 3, the audio only title search pointer table information AOTT-SRPTI (see FIG. 2) has 4 bytes. Specifically, the audio only title search pointer table information AOTT-SRPTI has a 2-byte area representing the number of the audio only title search pointers which is denoted by AOTT-SRP-Ns, and a 2-byte area representing an end address of the audio only title search pointer table which is denoted by AOTT-SRPT-EA.

As shown in FIG. 4, each of the audio only title search pointers AOTT-SRPs (see FIG. 2) has 12 bytes. Specifically, each of the audio only title search pointers AOTT-SRPs has a 1-byte area representing an audio title category ATT-CAT, a 1-byte area representing the number AOTT-PG-Ns of programs or tracks in the related audio only title (AOTT), a 4-byte area representing an AOTT total playback time AOTT-PB-TM, a 1-byte area representing an ATS number (order number or identification number) ATSN, a 1-byte area representing an ATS title number (order number or identification number) ATS-TTN, and a 4-byte area representing an ATS start address ATS-SA.

As shown in FIG. 5, the audio title category ATT-CAT (see FIG. 4) has a sequence of 8 bits b7, b6, b5, b4, b3, b2, b1, and b0. The bit b7 represents the presence or absence of AOTT. Specifically, the bit b7 being "0" indicates the absence of AOTT. The bit b7 being "1" indicates the presence of AOTT. A set of the bits b6, b5, and b4 corresponds to a reserved area. A set of the bits b3, b2, b1, and b0 represents the order number or the identification number of an AOTT group to which the related audio only title (AOTT) belongs. The AOTT group order number is denoted by AOTT-GRN.

The 4-byte AOTT total playback time AOTT-PB-TM in FIG. 4 means a total presentation time or a playback output time of the related AOTT. The AOTT total playback time AOTT-PB-TM is expressed in units such that 1/90000 second corresponds to one bit.

Figure 6:
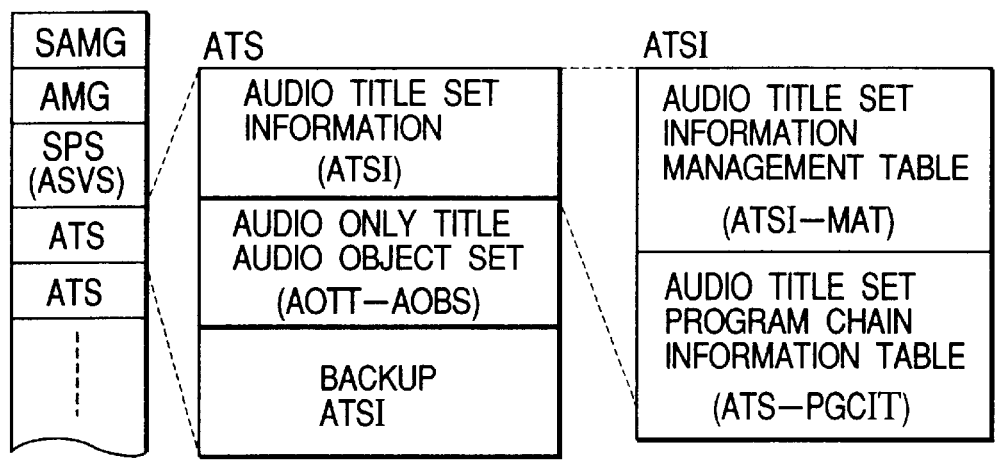
FIG. 6 is a diagram of the structure of an ATS area in FIG. 1.

As shown in FIG. 6, each of the audio title sets ATS<1>, ATS<2>, ..., ATS<m−1>, and ATS<m>has a sequence of audio title set (ATS) information ATSI, an audio only title audio object set AOTT-AOBS, and backup audio title set information ATSI. The audio title set information ATSI contains playback control information. Specifically, the audio title set information ATSI has a sequence of an audio title set information management table ATSI-MAT, and an audio title set program chain information table ATS-PGCIT.

Figure 7:
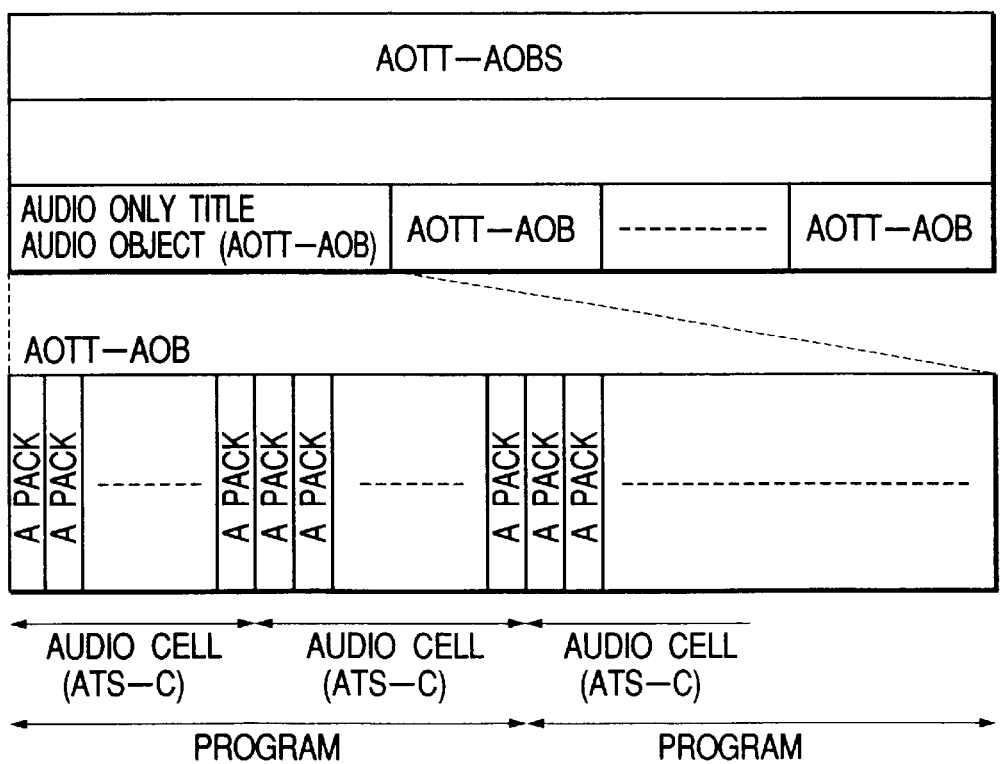
FIG. 7 is a diagram of the structure of an AOTT-AOBS area in FIG. 6 which includes an AOTT-AOB area of a first type.

As shown in FIG. 7, the audio only title audio object set AOTT-AOBS has a sequence of audio only title audio objects AOTT-AOB. Each of the audio only title audio objects AOTT-AOB is formed by a plurality of programs (tunes or movements) PG. Each of the programs PG is formed by a plurality of cells ATS-C.

Generally, audio only title audio objects AOTT-AOB are of first and second types. Each audio only title audio object AOTT-AOB of the first type contains only audio data. Each audio only title audio object AOTT-AOB of the second type contains not only audio data but also real-time information data (RTI data). Audio only title audio objects AOTT-AOB of at least one type are stored in the DVD-Audio or a tune therein.

With reference to FIG. 7, each program PG in an audio only title audio object AOTT-AOB of the first type is formed by a plurality of audio cells ATS-C. Each of the audio cells ATS-C is composed of only audio packs A.

Figure 8:
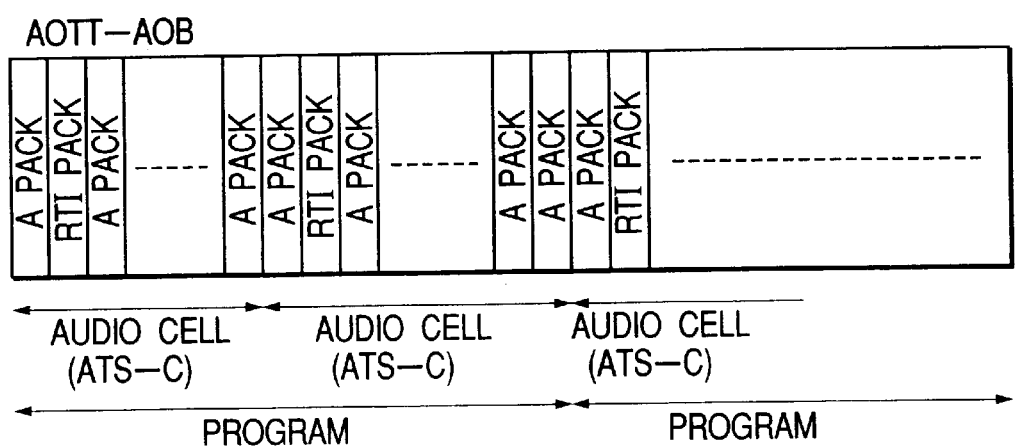
FIG. 8 is a diagram of the structure of an AOTT-AOB area of a second type.

As shown in FIG. 8, each program PG in an audio only title audio object AOTT-AOB of the second type is formed by a plurality of audio cells ATS-C. Each of the audio cells ATS-C has a pack sequence of a real-time information pack RTI and audio packs A. Regarding the pack sequence in each audio cell ATS-C, the real-time information pack RTI occupies the second place while the audio packs A occupy the other places.

Figure 9:
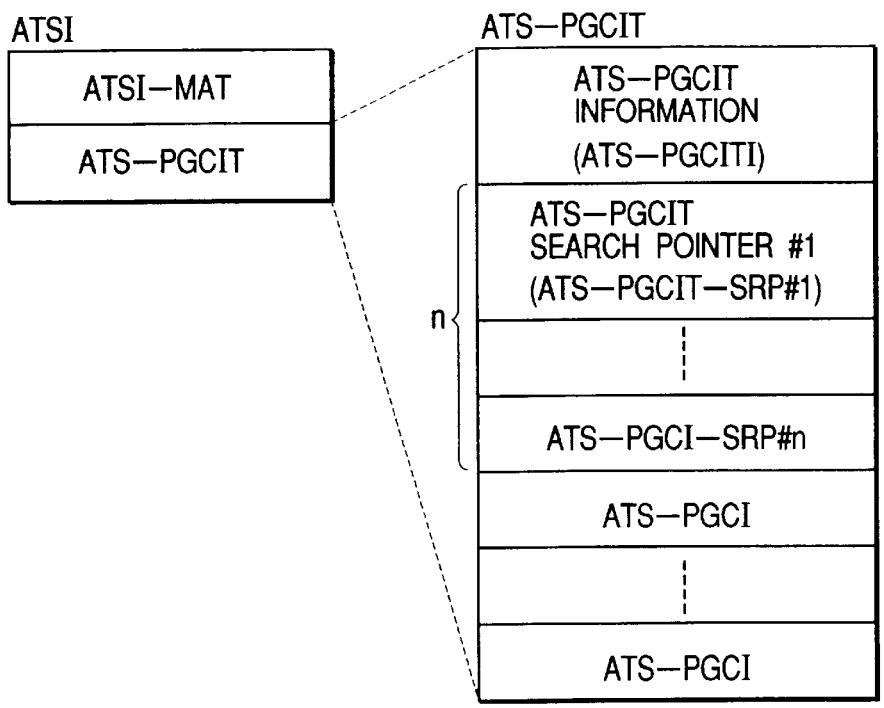
FIG. 9 is a diagram of the structure of an ATS-PGCIT area in FIG. 6.

FIG. 9 shows the details of the audio title set program chain information table ATS-PGCIT in FIG. 6. As shown in FIG. 9, the audio title set program chain information table ATS-PGCIT has a sequence of audio title set PGCI table information ATS-PGCITI, audio title set PGCI search pointers ATS-PGCI-SRP#1-#n, and audio title set program chain information pieces ATS-PGCI. Here, "n" denotes a given natural number.

Figure 10:
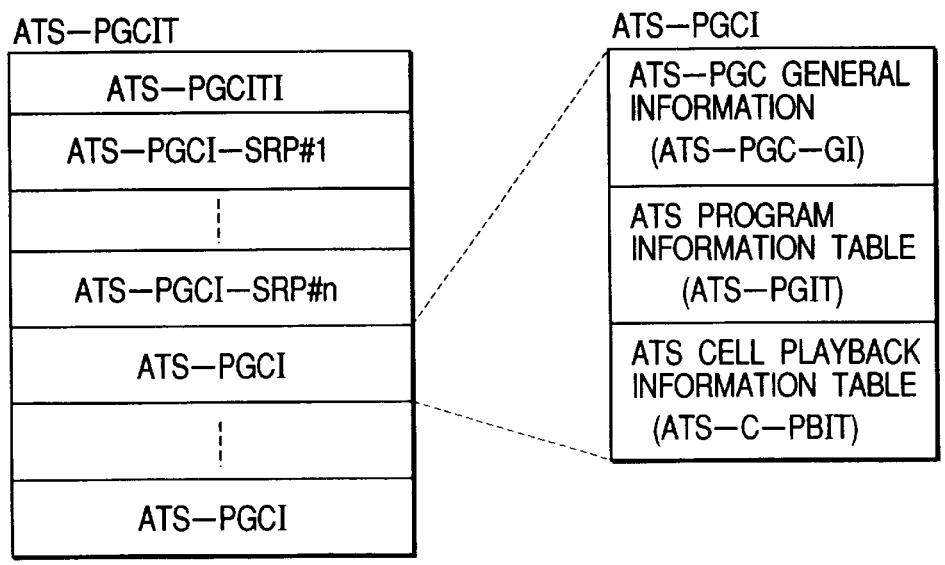
FIG. 10 is a diagram of the structure of an ATS-PGCI area in FIG. 9.

As shown in FIG. 10, each of the audio title set program chain information pieces ATS-PGCI (see FIG. 9) has a sequence of ATS-PGC general information ATS-PGC-GI, an ATS program information table ATS-PGIT, and an ATS cell playback information table ATS-C-PBIT.

Figures 11, 12:
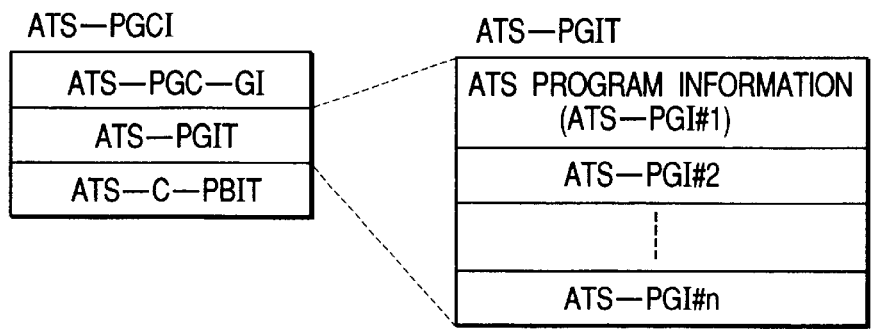
FIG. 11 is a diagram of the structure of an ATS-PGC-GI area in FIG. 10.
FIG. 12 is a diagram of the structure of an ATS-PGIT area in FIG. 10.

As shown in FIG. 11, the ATS-PGC general information ATS-PGC-GI has 16 bytes. The ATS-PGC general information ATS-PGC-GI has a sequence of a 4-byte area representing ATS-PGC contents ATS-PGC-CNT, a 4-byte area representing an ATS-PGC playback time ATS-PGC-PB-TM, a 2-byte reserved area, a 2-byte area representing an ATS-PGIT start address, a 2-byte area representing an ATS-C-PBIT start address, and a 2-byte reserved area.

FIG. 12 shows the details of the ATS program information table ATS-PGIT in FIG. 10. As shown in FIG. 12, the ATS program information table ATS-PGIT has a sequence of ATS program information pieces ATS-PGI#1-#n.

As shown in FIG. 13, each of the ATS program information pieces ATS-PGI#1-#n has 20 bytes. Specifically, each of the ATS program information pieces ATS-PGI#1-#n has a sequence of a 4-byte area representing ATS-PG contents ATS-PG-CNT, a 1-byte area representing an ATS-PG entry cell number, a 1-byte reserved area, a 4-byte area representing a first ATS-PG audio cell start presentation time FAC-S-PTM, a 4-byte area representing an ATS-PG playback time, a 4-byte area representing an ATS-PG pause time, a 1-byte area assigned to copyright management information CMI, and a 1-byte reserved area. The 1-byte area for copyright management information CMI may be used as a reserved area.

FIG. 14 shows the details of the ATS cell playback information table ATS-C-PBIT in FIG. 10. As shown in FIG. 14, the ATS cell playback information table ATS-C-PBIT has a sequence of ATS cell playback information pieces ATS-C-PBI#1-#n.

Figures 15, 16:
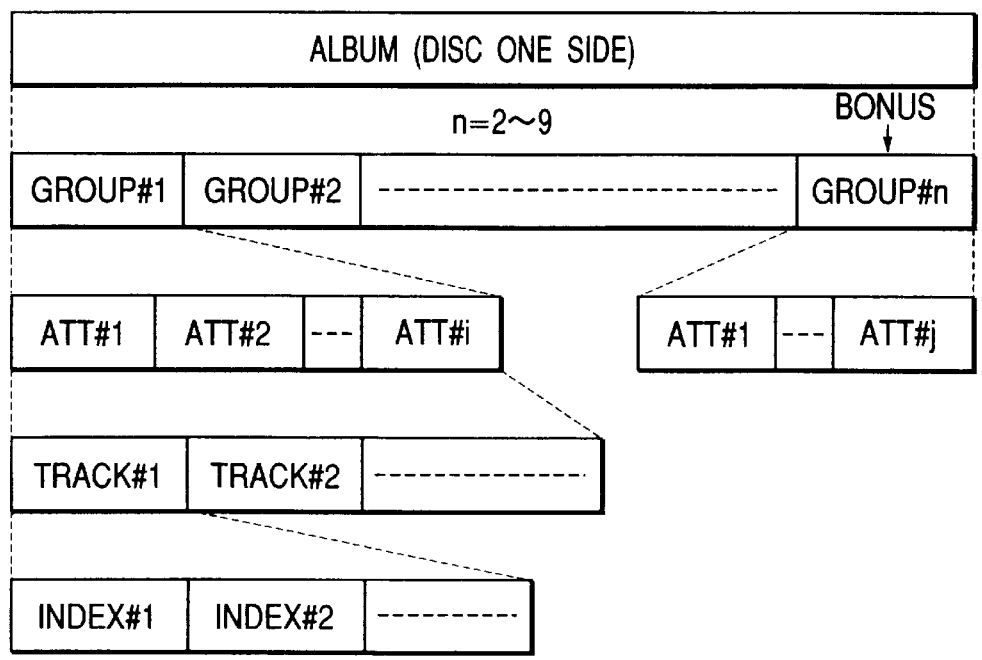
FIG. 15 is a diagram of the structure of an ATS-C-PBI area in FIG. 14.
FIG. 16 is a diagram of the structure of audio data recorded on an DVD-Audio.

As shown in FIG. 15, each of the ATS cell playback information pieces ATS-C-PBI#1-#n has 12 bytes. Specifically, each of the ATS cell playback information pieces ATS-C-PBI#1-#n has a sequence of a 1-byte area representing an ATS-C index number, a 1-byte area representing an ATS-C type ATS-C-TY, a 2-byte reserved area, a 4-byte area representing an ATS-C start address, and a 4-byte area representing an ATS-C end address.

FIG. 16 shows the structure or arrangement of audio data recorded on the DVD-Audio. One album denotes audio data recorded on the whole of one side of the DVD-Audio. In the case where the DVD-Audio has only one effective side, there is only one album. In the case where the DVD-Audio has two effective sides, there are two albums corresponding to the respective sides. As shown in FIG. 16, one album is composed of "n" groups (title groups) #1-#n, where "n" denotes a given natural number in the range from 1 to 9. In the case where the audio data on the DVD-Audio contains information of a bonus tune or tunes, the number "n" is in the range from 2 to 9. All the audio data representing the bonus tune or tunes are located in the last title group #n. The "n" title groups can be discriminated from each other by identification numbers or order numbers assigned thereto. The identification numbers or the order numbers are #1, #2, . . . , #n.

One title group corresponds to a unit in continuous playback implemented by a player. Specifically, one title group corresponds to a unit in continuous playback of audio titles ATT which is executed by a player. As shown in FIG. 16, one title group is formed by audio titles ATT#1-#i or audio titles ATT#1-#j, where "i" and "j" denote arbitrary natural numbers which can be freely chosen by the disc manufacturer. The audio titles ATT#1-#i or the audio titles ATT#1-#j are audio titles ATT in the audio title sets ATS<1>, ATS<2>, . . . , ATS<m–1>, and ATS<m>of FIG. 1. During playback, the audio titles ATT#1-#i or the audio titles ATT#-#j are searched for and are reproduced by the player in response to the playback control information in the audio manager information AMGI and the audio title set information ATSI (see FIGS. 1 and 6).

In general, audio titles ATT are of first and second types. Audio titles ATT of the first type are audio only titles AOTT devoid of video data. Audio titles ATT of the second type are audio video titles AVTT loaded with both an audio data piece and a video data piece. The audio title sets ATS<1>, ATS<2>, . . . , ATS<m–1>, and ATS<m>in FIG. 1 are exclusively occupied by audio only titles AOTT.

As shown in FIG. 16, each group of audio titles ATT#1-#i (or ATT#1-#j has a set of tracks #1, #2, . . . . Each of the tracks #1, #2, . . . has a set of indexes #1, #2, . . . .

Second Embodiment

Figure 17:
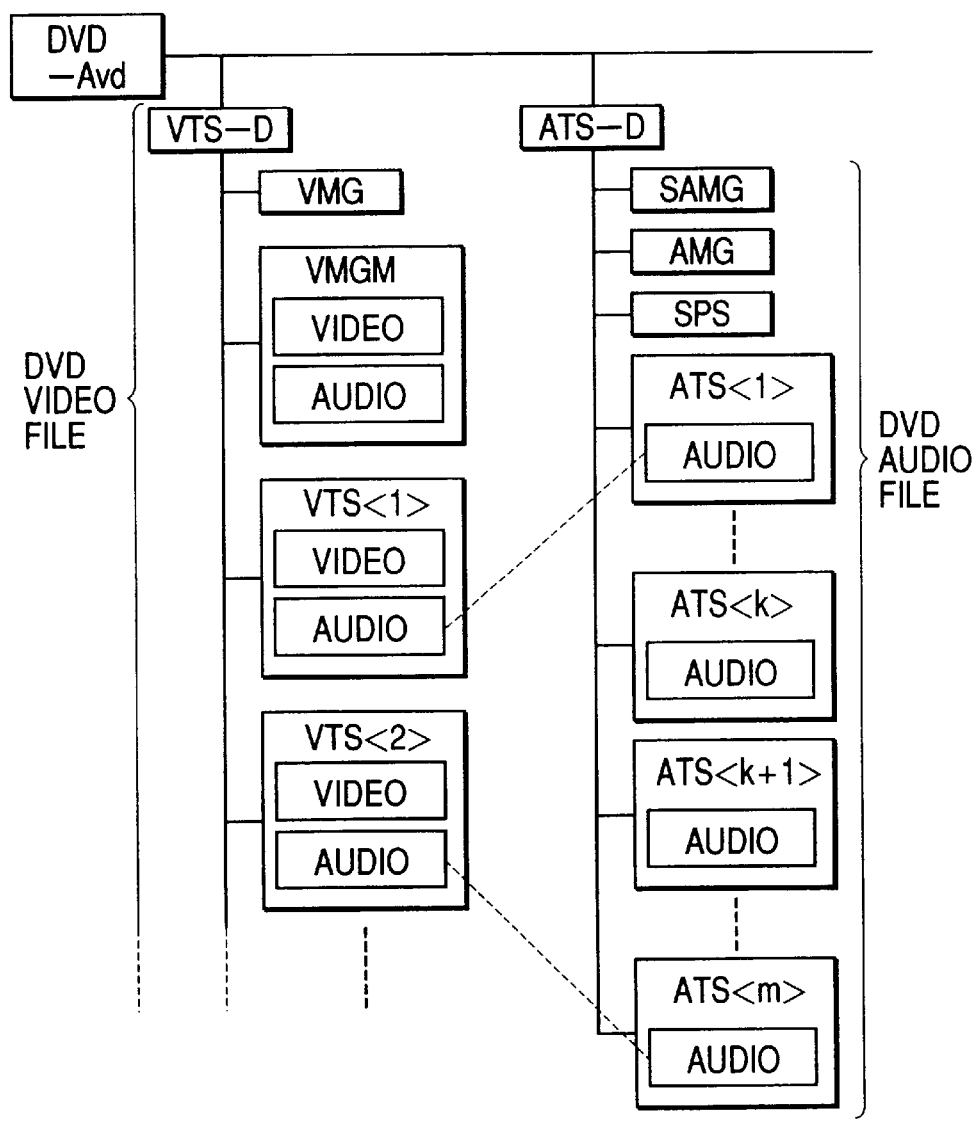
FIG. 17 is a diagram of the signal recording format of a DVD-Avd according to a second embodiment of this invention.

FIG. 17 shows the signal recording format of a DVD-Avd (DVD-Audio plus AV data) according to a second embodiment of this invention. The DVD-Avd is in a DVD family. The DVD-Avd in FIG. 17 is similar to the DVD-Audio in FIG. 1 except for design changes mentioned hereinafter.

The DVD-Avd in FIG. 17 has an area assigned to a DVD-Video file, and an area assigned to a DVD-Audio file. The DVD-Video file is a video title set directory VTS-D. The DVD-Audio file is an audio title set directory ATS-D.

Similar to the DVD-Audio in FIG. 26, the DVD-Avd has a first recording area and a second recording area. The first recording area and the second recording area are successively arranged in the region from the lead-in position to the lead-out position on the DVD-Avd. Preferably, the first recording area is in a lead-in area of the DVD-Avd. The first recording area is used for storing an auxiliary signal while the second recording area is used for storing a main signal representing the DVD-Video file and the DVD-Audio file (see FIG. 17).

The VTS-D area in FIG. 17 has an area assigned to a video manager VMG, an area assigned to a video manager menu VMGM, and areas assigned to respective video title sets VTS<1>, VTS<2>, . . . . The video manager VMG contains video manager information VMGI for managing the video title sets VTS<1>, VTS<2>, . . . . Each of the video title sets VTS<1>, VTS<2>, . . . has a sequence of packs including video packs V and audio packs A.

The ATS-D area in FIG. 17 is similar in structure to that in FIG. 1. The ATS-D area in FIG. 17 includes an area assigned to an audio manager AMG, and areas assigned to respective audio title sets ATS<1>, ATS<2>, . . . , ATS<m–1>, and ATS<m>. The audio manager AMG contains audio manager information AMGI for managing the audio title sets ATS<1>, ATS<2>, . . . , ATS<m–1>, and ATS<m>. An audio data piece in the audio title set ATS<1>forms a pair with an audio data piece in the video title set VTS<1>. An audio data piece in the audio title set ATS<m>forms a pair with an audio data piece in the video title set VTS<2>. Audio data pieces in the other audio title sets ATS do not form any pairs with audio data pieces in the VTS-D side.

Third Embodiment

Figure 18:
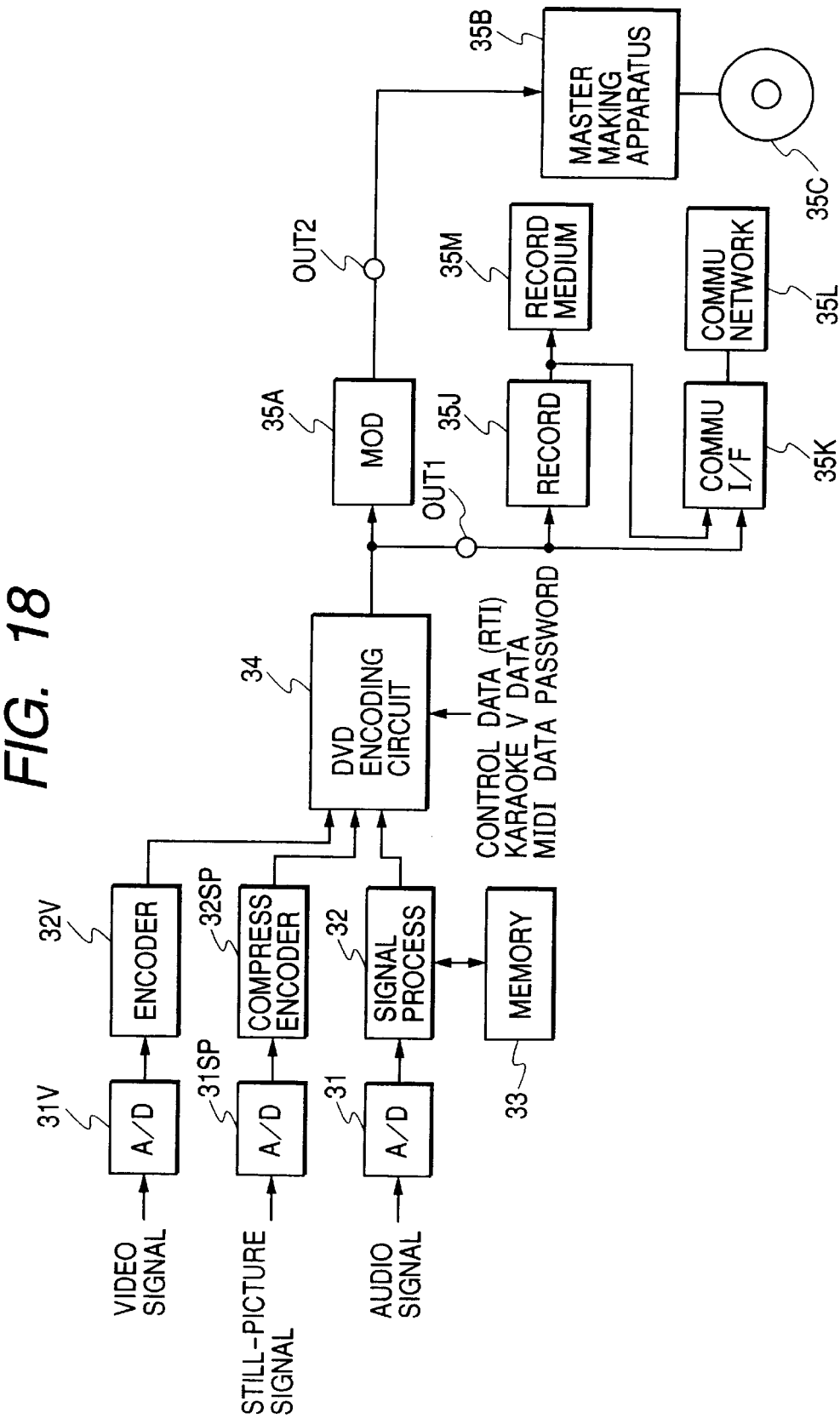
FIG. 18 is a block diagram of a signal encoding apparatus according to a third embodiment of this invention.

FIG. 18 shows a signal encoding apparatus according to a third embodiment of this invention. The apparatus of FIG.

18 includes analog-to-digital (A/D) converters 31, 31V, and 31SP, a signal processing circuit 32, a video encoder 32V, a compressive encoder 32SP, a memory 33, a DVD encoding circuit 34, and a modulation circuit 35A.

An analog audio signal is applied to the A/D converter 31. The analog audio signal represents main tunes (non-bonus tunes) and bonus tunes. The A/D converter 31 is followed by the signal processing circuit 32. The signal processing circuit 32 is followed by the DVD encoding circuit 34. The memory 33 is connected to the signal processing circuit 32. The signal processing circuit 32 and the memory 33 cooperate to implement conventional signal processing. The DVD encoding circuit 34 is followed by the modulation circuit 35A and an output terminal OUT1. The modulation circuit 35A is followed by an output terminal OUT2.

An analog video signal is applied to the A/D converter 31V. In general, the analog video signal represents moving pictures. The A/D converter 31V is followed by the video encoder 32V. The video encoder 32V is followed by the DVD encoding circuit 34.

An analog signal representing still pictures is applied to the A/D converter 31SP. The A/D converter 31SP is followed by the compressive encoder 32SP. The compressive encoder 32SP is followed by the DVD encoding circuit 34.

The A/D converter 31 periodically samples the analog audio signal at a frequency of, for example, 192 kHz, and thereby changes the analog audio signal into a corresponding digital audio signal. The digital audio signal is, for example, a PCM signal having a sequence of samples each having 24 bits. The A/D converter 31 outputs the digital audio signal to the signal processing circuit 32.

Operation of the signal processing circuit 32 can be changed between first and second modes which correspond to the absence and the presence of signal compression respectively.

During operation of the signal processing circuit 32 in the first mode (the absence of signal compression), the digital audio signal is transmitted from the A/D converter 31 to the DVD encoding circuit 34 through the signal processing circuit 32 without being compressed. During operation of the signal processing circuit 32 in the second mode (the presence of signal compression), the combination of the signal processing circuit 32 and the memory 33 compresses the digital audio signal. In this case, the signal processing circuit 32 outputs the compression-resultant digital audio signal to the DVD encoding circuit 34. The signal compression implemented by the signal processing circuit 32 is based on a signal thinning process, a signal decimating process, or a bit shifting process. In the case where the analog audio signal has multiple channels separated into a group "1" and a group "2", bit shifting processes are implemented separately for the group "1" and the group "2".

The A/D converter 31V changes the analog video signal into a corresponding digital video signal. The A/D converter 31V outputs the digital video signal to the video encoder 32V. The video encoder 32V changes the digital video signal into an MPEG-format signal. The video encoder 32V outputs the MPEG-format signal to the DVD encoding circuit 34.

The A/D converter 31SP changes the analog still-picture signal into a corresponding digital still-picture signal. The A/D converter 31SP outputs the digital still-picture signal to the compressive encoder 32SP. The compressive encoder 32SP changes the digital still-picture signal into an MPEG-format still-picture signal. The compressive encoder 32SP outputs the MPEG-format still-picture signal to the DVD encoding circuit 34.

The DVD encoding circuit 34 receives added information (information to be added) from suitable devices which are not shown in the drawings. The added information contain control data, copyright data, real-time information (RTI) data, character data, data representative of a disc identifier, karaoke video data, MIDI data, data representative of quizzes, and data representative of a password. The DVD encoding circuit 34 multiplexes and formats the output audio signal from the signal processing circuit 32, the output video signal from the video encoder 32V, the output still-picture signal from the compressive encoder 32SP, and the added information into a composite signal of a DVD-Audio format according with the signal recording format in FIG. 1 and the data structure in FIG. 16 or a composite signal of a DVD-Avd format according with the signal recording format in FIG. 17.

The DVD encoding circuit 34 may output the composite signal of the DVD-Audio format or the DVD-Avd format to the modulation circuit 35A. In this case, the modulation circuit 35A subjects the composite signal of the DVD-Audio format or the DVD-Avd format to given modulation (for example, EFM modulation) suited to a DVD-Audio and a DVD-Avd. A master making apparatus 35B may be connected to the modulation circuit 35A via the output terminal OUT2. In this case, the modulation circuit 35A outputs the modulation-resultant signal to the master making apparatus 35B. The apparatus 35B makes a master disc 35C in response to the output signal of the modulation circuit 35A. The maser disc 35C stores the output signal of the modulation circuit 35A. DVD-Audios or DVD-Avds are made by a DVD making apparatus (not shown) on the basis of the master disc 35C.

A recording and reproducing apparatus 35J may be connected to the DVD encoding circuit 34 via the output terminal OUT1. In this case, the recording and reproducing apparatus 35J receives the composite signal of the DVD-Audio format or the DVD-Avd format from the DVD encoding circuit 34. The recording and reproducing apparatus 35J records the composite signal of the DVD-Audio format or the DVD-Avd format on a suitable recording medium 35M. The recording and reproducing apparatus 35J reproduces the composite signal of the DVD-Audio format or the DVD-Avd format from the recording medium 35M. The recording and reproducing apparatus 35J outputs the reproduced composite signal of the DVD-Audio format or the DVD-Avd format.

A communication interface 35K may be connected to the DVD encoding circuit 34 via the output terminal OUT1, and be connected to the recording and reproducing apparatus 35J. In this case, the communication interface 35K receives the composite signal of the DVD-Audio format or the DVD-Avd format from the DVD encoding circuit 34 or the recording and reproducing apparatus 35J. The communication interface 35K is connected to a communication network L such as the Internet or a karaoke communication network. The communication interface 35K converts the received signal into a bit stream of a prescribed communication format. The communication interface 35K outputs the bit stream to the communication network L. The bit stream is transmitted by the communication network L.

Figure 19:
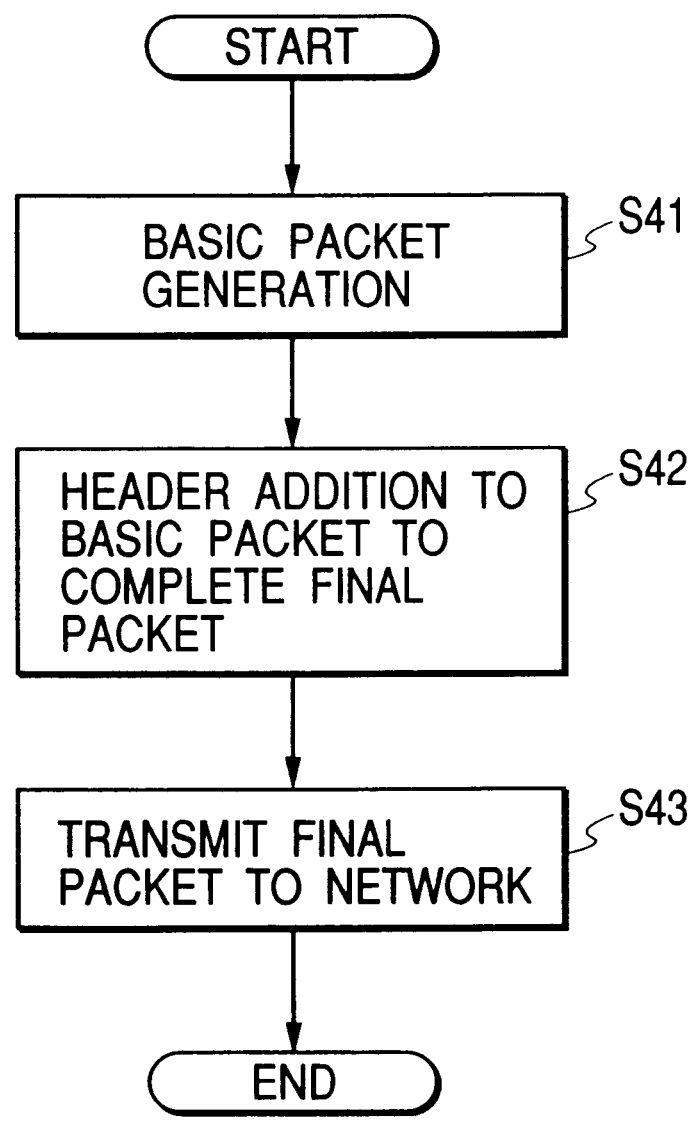
FIG. 19 is a flowchart of a segment of a control program for a communication interface in FIG. 18.

The communication interface 35K includes a computer-based packeting circuit which operates in accordance with a control program stored in an internal memory. FIG. 19 is a flowchart of a segment of the control program. The program segment in FIG. 19 is designed to handle the output signal from the DVD encoding circuit 34 or the recording and reproducing apparatus 35J. As shown in FIG. 19, a first step S41 of the program segment divides the incoming signal (the output signal from the DVD encoding circuit 34 or the recording and reproducing apparatus 35J) into basic packets each having a predetermined number of bits. A step S42 following the step S41 adds headers to the starting ends of the basic packets to change the basic packets to final packets respectively. Generally, the added headers include destination addresses. A step S43 subsequent to the step S42 sequentially transmits the final packets to the communication network L. After the step S43, the current execution cycle of the program segment ends.

The signal encoding apparatus FIG. 18 may be formed by a computer-based apparatus which operates in accordance with a computer program stored in an internal memory. In this case, a recording medium such as a CD-ROM may be prepared which stores the control program. The internal memory of the computer-based apparatus is loaded with the computer program from the recording medium, and then the computer-base apparatus is started to implement a desired encoding process in accordance with the computer program. Alternatively, the computer program may be downloaded into the internal memory of the computer-based apparatus via a communication network such as the Internet or a karaoke communication network.

Fourth Embodiment

Figure 20:
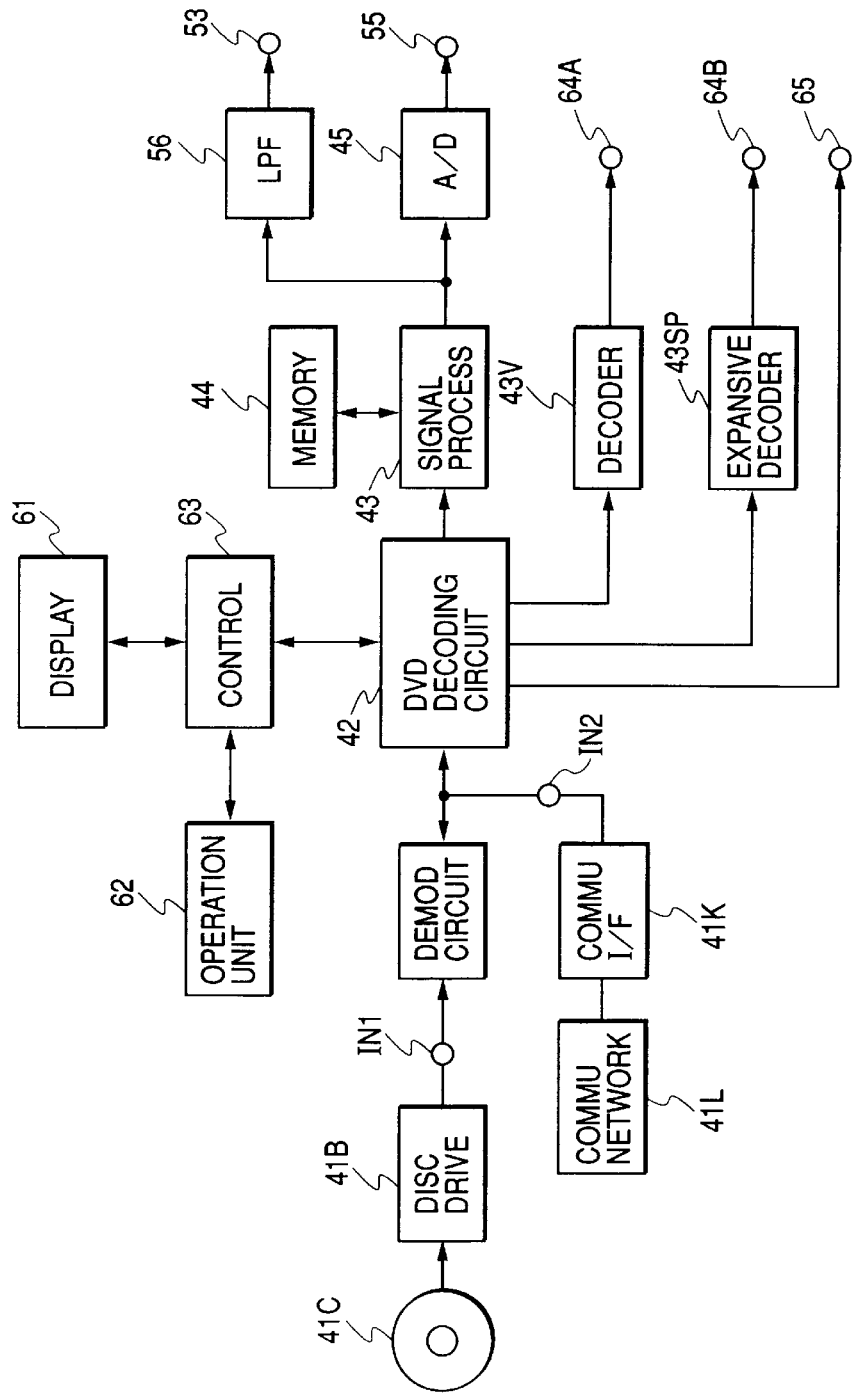
FIG. 20 is a block diagram of a signal decoding apparatus according to a fourth embodiment of this invention.

FIG. 20 shows a signal decoding apparatus according to a fourth embodiment of this invention. The apparatus of FIG. 20 includes a demodulation circuit 41A, a DVD decoding circuit 42, a signal processing circuit 43, a video decoder 43V, an expansive decoder 43SP, a memory 44, a digital-to-analog (D/A) converter 45, a low pass filter (LPF) 56, a display 61, an operation unit 62, and a controller 63.

The demodulation circuit 41A is connected to an input terminal IN1. A disc drive 41B for reproducing a signal from a DVD-Audio or a DVD-Avd 41C may be connected to the demodulation circuit 41A via the input terminal IN1. In this case, the demodulation circuit 41A receives the reproduced signal from the disc drive 41B. The demodulation circuit 41A is connected to the DVD decoding circuit 42. The DVD decoding circuit 42 is connected to the signal processing circuit 43, the video decoder 43V, and the expansive decoder 43SP. The memory 44 is connected to the signal processing circuit 43. The signal processing circuit 43 and the memory 44 cooperate to implement conventional signal processing which is inverse with respect to the signal processing by the combination of the signal processing circuit 32 and the memory 33 in the signal encoding apparatus (see FIG. 18). The signal processing circuit 43 is connected to the D/A converter 45 and the low pass filter 56. The controller 63 is connected to the DVD encoding circuit 42, the display 61, and the operation unit 62.

The DVD decoding circuit 42 is connected to an input terminal IN2. A communication interface 41K with a communication network 41L may be connected to the DVD decoding circuit 42 via the input terminal IN2. In this case, the DVD decoding circuit 42 receives a signal from the communication network 41L via the communication interface 41K. Specifically, the communication interface 41K receives a bit stream of a prescribed communication format from the communication network 41L. The communication network 41L is, for example, the Internet or a karaoke communication network. The communication interface 41K converts the bit stream into a DVD-Audio signal or a DVD-Avd signal corresponding to the output signal of the DVD encoding circuit 34 in the signal encoding apparatus (see FIG. 18). The DVD decoding circuit 42 receives the DVD-Audio signal or the DVD-Avd signal from the communication interface 41K. The signal conversion by the communication is interface 41K is inverse with respect to the signal conversion by the interface circuit 35K in the signal encoding apparatus (see FIG. 8).

The demodulation circuit 41A can receive the output signal of the disc drive 41B. The demodulation circuit 41A subjects the received signal to given demodulation suited to a DVD-Audio and a DVD-Avd. The demodulation by the circuit 41A is inverse with respect to the modulation by the circuit 35A in the signal encoding apparatus (see FIG. 18). The DVD decoding circuit 42 receives the demodulation-resultant signal from the demodulation circuit 41A.

The DVD decoding circuit 42 deformats and demultiplexes the received signal into a digital audio signal, a digital video signal, a digital still-picture signal, and a digital added-information signal. The signal processing by the DVD decoding circuit 42 is inverse with respect to the signal processing by the DVD encoding circuit 34 in the signal encoding apparatus (see FIG. 18). The digital added-information signal contains control data, copyright data, real-time information (RTI) data, character data, data representative of a disc identifier, karaoke video data, MIDI data, data representative of quizzes, and data representative of a password. The DVD decoding circuit 42 outputs the digital audio signal to the signal processing circuit 43. The DVD decoding circuit 42 outputs the digital video signal to the video decoder 43V. The DVD decoding circuit 42 outputs the digital still-picture signal to the expansive decoder 43SP.

The signal processing circuit 43 transmits the digital audio signal to the D/A converter 45 and the low pass filter 56 without executing signal expansion during a first mode of operation. The signal processing circuit 43 expands the digital audio signal during a second mode of operation. The signal processing circuit 43 outputs the expansion-resultant digital audio signal to the D/A converter 45 and the low pass filter 56. The signal expansion by the signal processing circuit 43 is inverse with respect to the signal compression by the signal processing circuit 32 in the signal encoding apparatus (see FIG. 18).

The D/A converter 45 changes the digital audio signal into a corresponding analog audio signal in response to a clock signal having a frequency equal to the sampling frequency related to the A/D converter 31 in the signal encoding apparatus (see FIG. 18). The D/A converter 45 feeds the analog audio signal to an output terminal 55.

The low pass filter 56 limits the frequency band of the digital audio signal to a frequency width of, for example, 48 kHz. The low pass filter 56 feeds the resultant digital audio signal to an output terminal 53.

The video decoder 43V subjects the digital video signal to an MPEG decoding process. The video decoder 43V feeds the decoding-resultant digital video signal to an output terminal 64A. The signal processing by the video decoder 43V is inverse with respect to the signal processing by the video encoder 32V in the signal encoding apparatus (see FIG. 18). A display may be connected to the output terminal 64A. In this case, the display receives the output signal of the video decoder 43V, and indicates pictures represented by the received signal.

The expansive decoder 43SP subjects the digital still-picture signal to an MPEG decoding process. The expansive decoder 43SP feeds the decoding-resultant digital still-picture signal to an output terminal 64B. The signal processing by the expansive decoder 43SP is inverse with respect to the signal processing by the compressive encoder 32SP in the signal encoding apparatus (see FIG. 18). A display may be connected to the output terminal 64B. In this case, the display receives the output signal of the expansive decoder 43SP, and indicates pictures represented by the received signal.

The DVD decoding circuit 42 feeds the MIDI data to an output terminal 65. An electronic musical instrument may be connected to the output terminal 65. In this case, the electronic musical instrument receives the MIDI data via the output terminal 65, and converts the MIDI data into corresponding sounds.

Regarding the reproduction of still pictures, the DVD decoding circuit 42, the signal processing circuit 43, and the expansive decoder 43SP are designed to execute one of the following different processes 1), 2), and 3).

1) In the case where still-picture data are obtained, the playback of the audio signal is interrupted and a muting step is carried out.
2) In the case where still-picture data are obtained, the playback of the still-picture data and the playback of the audio signal are executed in response to a time control signal for the real-time synchronization therebetween.
3) In the case where still-picture data are obtained, the playback of the audio signal is executed while the playback of the still-picture data is implemented in response to a page turning command so that still-picture pages are turned. The page turning command is activated by a user's request.

Figure 21:
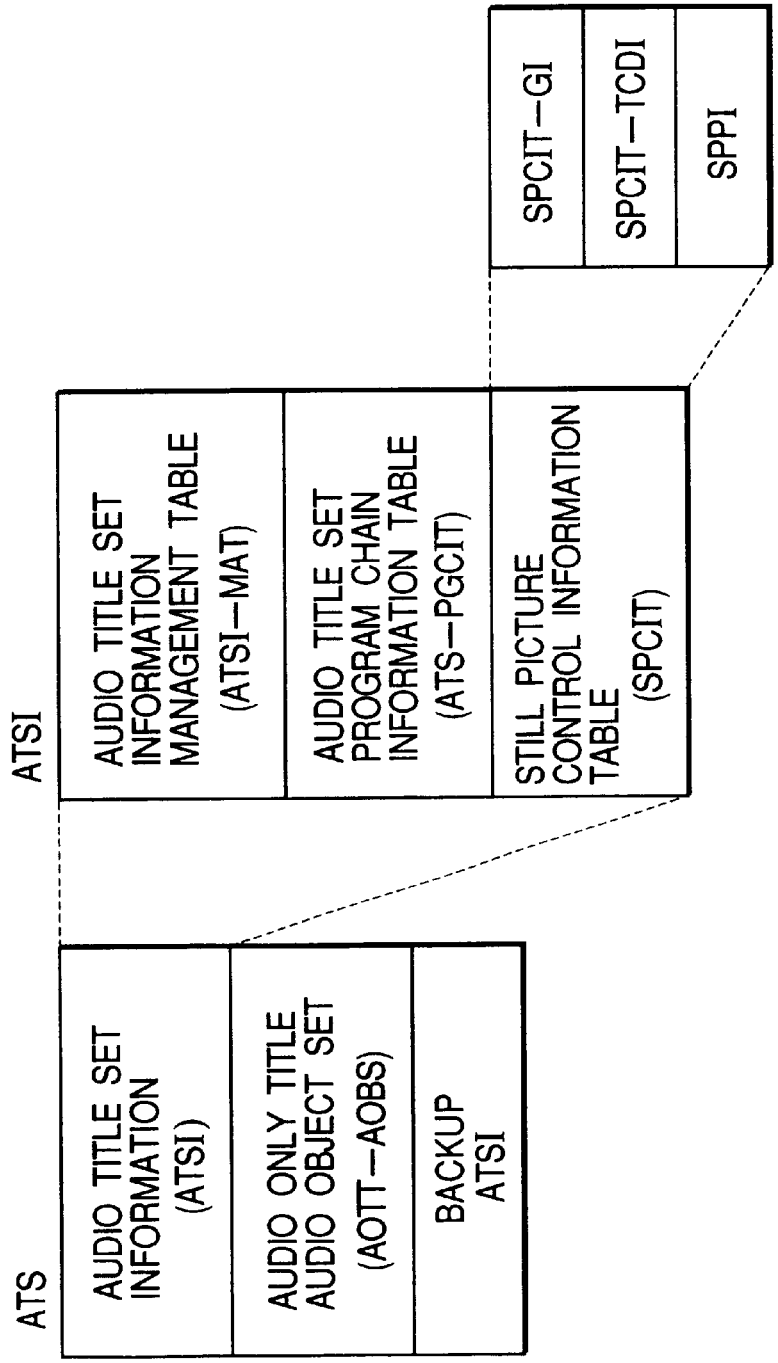
FIG. 21 is a diagram of the structure of an ATSI area in the signal recording format of a DVD-Audio.

The audio title set information ATSI in FIG. 6 may be replaced by audio title set information ATSI in FIG. 21. The audio title set information ATSI in FIG. 21 has a sequence of an audio title set information management table ATSI-MAT, an audio title set program chain information table ATS-PGCIT, and a still-picture control information table SPCIT. The still-picture control information table SPCIT has a sequence of SPCIT general information SPCIT-GI, SPCIT time control data information SPCIT-TCDI, and still-picture page control command information SPPI.

The time control signal for the real-time synchronization between the still-picture signal and the audio signal is contained in the SPCIT time control data information SPCIT-TCDI. The page turning command is contained in the still-picture page control command information SPPI.

Side information for page control of still pictures may be placed in a still-picture pack SPCT corresponding to the still-picture data. In this case, page control data prescribed by the side information are interpreted by referring to the still-picture page control command information SPPI. Alternatively, the side information for page control of still pictures may be placed in a real-time information pack RTI.

The operation unit 62 can be actuated by a user. The operation unit 62 generates various signals when being actuated. The signals generated by the operation unit 62 are inputted into the controller 63. The signals generated by the operation unit 62 include a signal for requesting playback to be started, a signal for selecting one from among title-group order numbers (title-group identification numbers) #1, #2, . . . , #n in accordance with a user's request, and a signal representing an input password.

The controller 63 includes a microcomputer, a CPU, or a similar device which operates in accordance with a control program stored in an internal memory. When the playback start request signal is inputted into the controller 63 from the operation unit 62, a first segment of the control program is executed. According to the first segment of the control program, the controller 62 outputs a menu signal to the display 61 and controls the display 61 so that a predetermined menu containing the title-group order numbers (the title-group identification numbers) #1, #2, . . . , #n is indicated thereon. In general, the user actuates the operation unit 62 to select one from among the title-group order numbers #1, #2, . . . , #n while monitoring the menu on the display 61. The selected title-group order number (the selected title-group identification number) corresponds to a title group desired to be played back.

Figure 22:
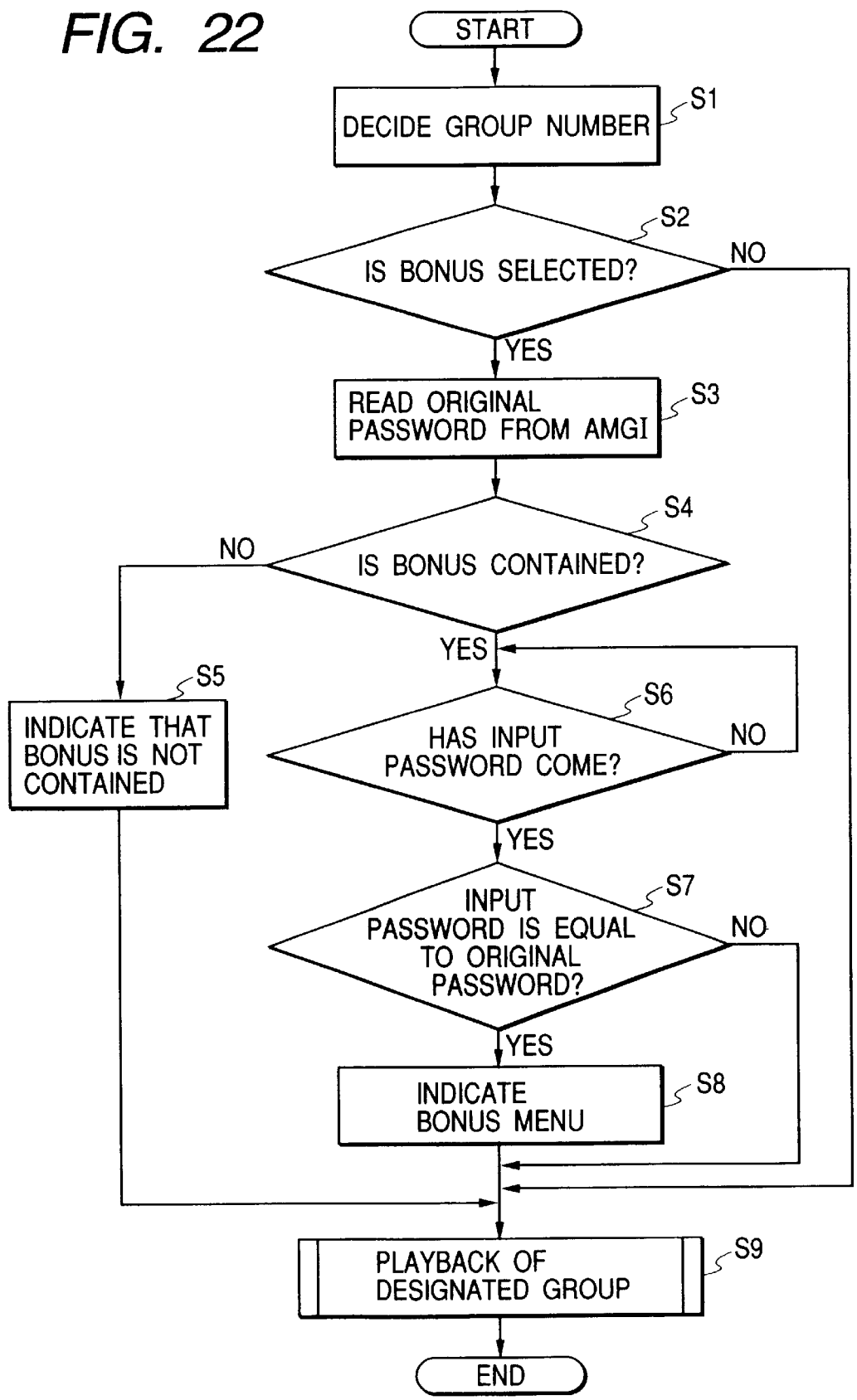
FIG. 22 is a flowchart of a segment of a control program for a controller in FIG. 20.

FIG. 22 is a flowchart of a second segment of the control program for the controller 63 which follows the first segment thereof. The second segment of the control program is started when the title-group order number selection signal is inputted into the controller 63 from the operation unit 62.

As shown in FIG. 22, a first step S1 of the second segment of the control program decides or recognizes the selected title-group order number (the selected title-group identification number) represented by the title-group order number selection signal.

A step S2 following the step S1 decides whether or not the selected title-group order number is equal to the order number #n of the last title group. The decision by the step S2 is to determine whether or not bonus information (a bonus tune or tunes) is selected. When the selected title-group order number is equal to the last title-group order number #n, that is, when bonus information is selected, the program advances from the step S2 to a step S3. Otherwise, the program advances from the step S2 to a block S9.

The step S3 controls the DVD decoding circuit 42, and gets data of an original password from audio manager information AMGI (see FIG. 1) recovered by the DVD decoding circuit 42.

A step S4 subsequent to the step S3 decides whether or not the original password is "0000", that is, whether or not the present DVD-Audio data (or the present DVD-Avd data) contain bonus information. When the present DVD-Audio data (or the present DVD-Avd data) do not contain bonus information, the program advances from the step S4 to a step S5. When the present DVD-Audio data contain bonus information, the program advances from the step S4 to a step S6.

The step S5 controls the display 61 to indicate that the present DVD-Audio data (or the present DVD-Avd data) do not contain bonus information. After the step S5, the program advances to the block S9.

The step S6 decides whether or not a signal representative of an input password has come from the operation unit 62. When an input-password signal has come, the program advances from the step S6 to a step S7. Otherwise, the step S6 is repeated.

The step S7 decides whether or not the input password is equal to the original password. When the input password is equal to the original password, the program advances from the step S7 to a step S8. When the input password differs from the original password, the program advances from the step S7 to the block S9.

The step S8 controls the DVD decoding circuit 42 and gets a signal of a bonus information menu from an audio manger menu AMGM (see FIG. 1) recovered by the DVD decoding circuit 42. The step S8 outputs the bonus menu signal to the display 61 and controls the display 61 to indicate a menu of bonus information. After the step S8, the program advances to the block S9.

The block S9 controls the DVD decoding circuit 42 to execute the playback of a designated title group which corresponds to the selected title-group order number (the selected title-group identification number). After the block S9, the current execution cycle of the second segment of the control program ends.

Figure 23:
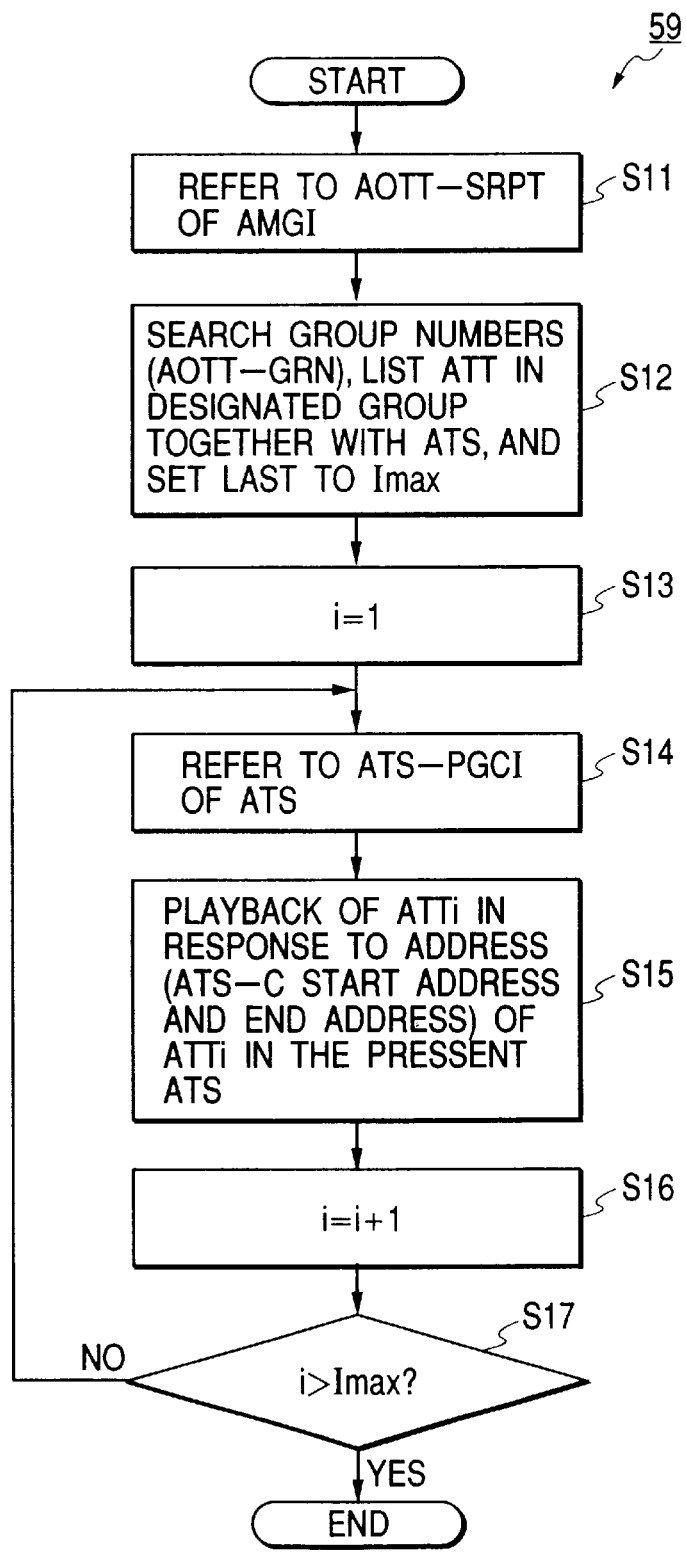
FIG. 23 is a flowchart of the details of a block in FIG. 22.

FIG. 23 shows the details of the block S9. As shown in FIG. 23, the block S9 has a step S11 which follows one of the steps S2, S5, S7, and S8 in FIG. 22. The step S11 refers to an audio only title search pointer table AOTT-SRPT in the audio manager information AMGI (see FIG. 2).

A step S12 subsequent to the step S11 searches AOTT group order numbers AOTT-GRN (see FIG. 5), and lists audio titles ATT belonging to the designated title group together with an audio title set or sets ATS. Specifically, the AOTT group order number is derived from each audio title category ATT-CAT (see FIG. 5), and the number AOTT-PG-Ns of programs or tracks in the related audio only title (AOTT) is derived from each audio only title search pointer AOTT-SRP (see FIG. 4). In addition, the ATS number ATSN is derived from each audio only title search pointer AOTT-SRP (see FIG. 4). The order number or the identification number Imax of the last audio title ATT in the designated title group is determined according to the listed audio titles ATT.

A step S13 following the step S12 sets a variable "i" to "1".

The variable "i" indicates an order number or an identification number of an audio title ATTi. After the step S13, the program advances to a step S14.

The step S14 refers to audio title set program chain information pieces ATS-PGCI in audio title set information ATSI (see FIG. 9–15), and thereby searches for the address of the audio title ATTi, that is, ATS-C start addresses and ATS-C end addresses.

A step S15 subsequent to the step S14 controls the DVD decoding circuit 42 in response to the addresses provided by the step S14, and thereby implements the playback of the audio title ATTi. The audio title number is derived from ATS-PG contents ATS-PG-CNT (see FIG. 13). A target index is found from an ATS-PG entry cell number (see FIG. 13).

A step S16 following the step S15 increments the audio title number "i" by "1".

A step S17 subsequent to the step S16 compares the audio title number "i" with the last audio title number Imax. When the audio title number "i" is not greater than the last audio title number Imax, the program returns from the step S17 to the step S14. On the other hand, when the audio title number "i" is greater than the last audio title number Imax, the program exits from the step S17 and then the current execution cycle of the second segment of the program ends.

With reference back to FIG. 20, the communication interface 41K includes a computer-based unpacketing circuit which operates in accordance with a control program stored in an internal memory.

Figure 24:
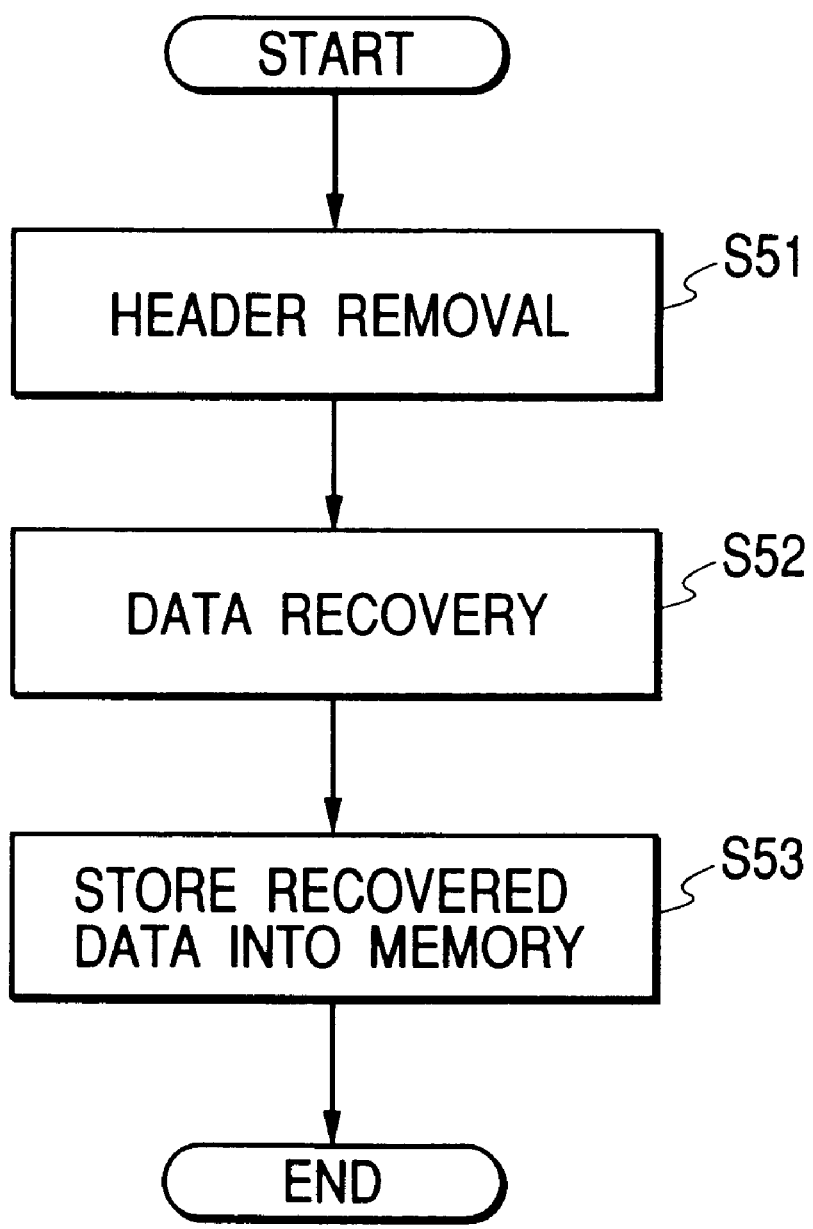
FIG. 24 is a flowchart of a segment of a control program for a communication interface in FIG. 20.

FIG. 24 is a flowchart of a segment of the control program. The program segment in FIG. 24 is designed to handle packets in the incoming signal from the communication network 41L. As shown in FIG. 24, a first step S51 of the program segment removes headers from received packets. A step S52 following the step S51 recovers original data from the header-less packets. A step S53 subsequent to the step S52 stores the recovered original data into a buffer memory within the communication interface 41K. The recovered data can be transmitted from the buffer memory to the DVD decoding circuit 42.

The signal decoding apparatus in FIG. 20 may be formed by a computer-based apparatus which operates in accordance with a computer program stored in an internal memory. In this case, a recording medium such as a CD-ROM may be prepared which stores the control program. The internal memory of the computer-based apparatus is loaded with the computer program from the recording medium, and then the computer-based apparatus is started to implement a desired decoding process in accordance with the computer program. Alternatively, the computer program may be downloaded into the internal memory of the computer-based apparatus via a communication network such as the Internet or a karaoke communication network.

Fifth Embodiment

Figure 25:
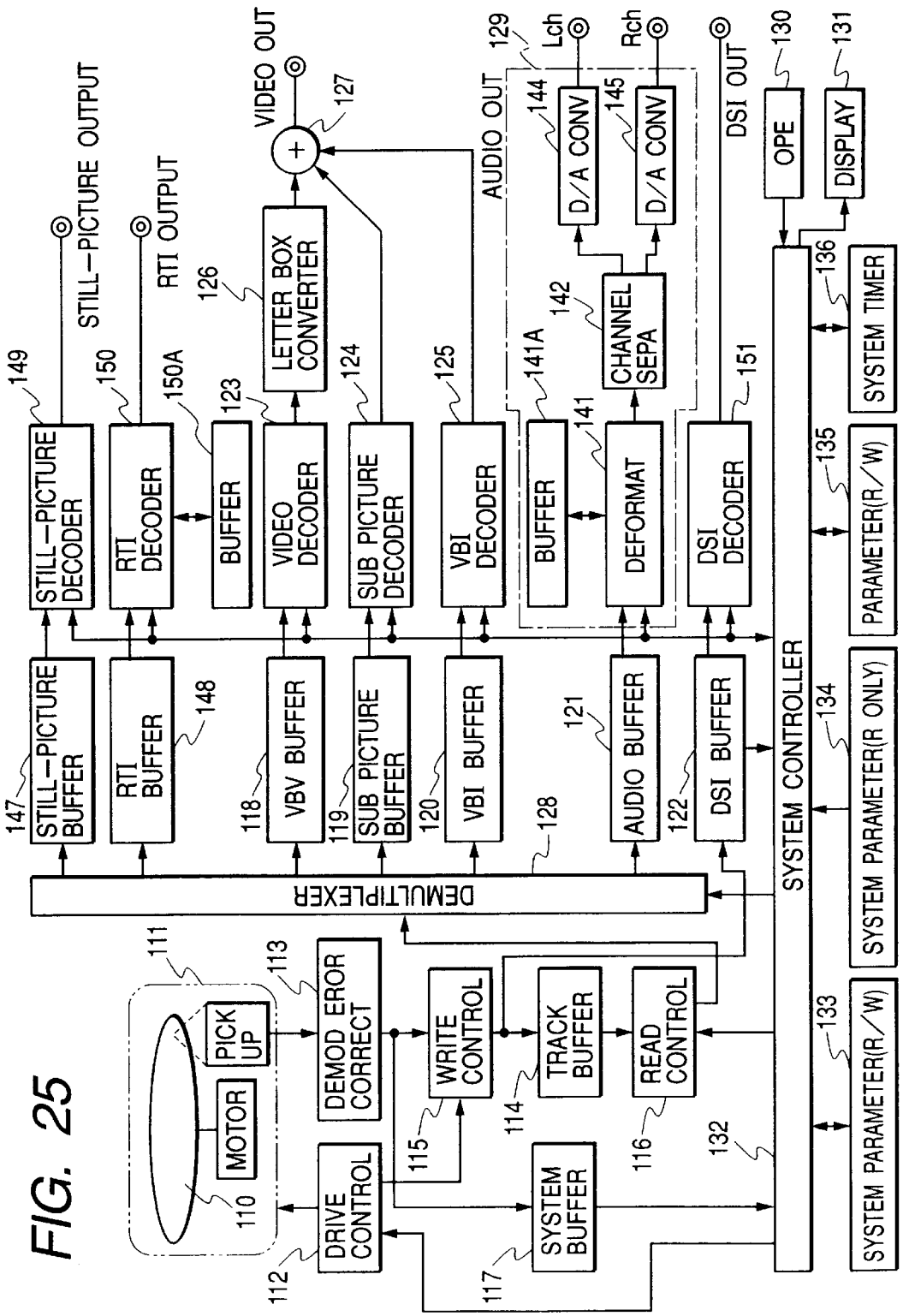
FIG. 25 is a block diagram of a DVD player according to a fifth embodiment of this invention.

FIG. 25 shows a DVD player according to a fifth embodiment of this invention. The player in FIG. 25 is designed to reproduce information from an DVD-Audio of the format in FIGS. 1 and 16, a DVD-Avd of the format in FIG. 17, or a DVD-family disc which stores time control information and a page turning command. The time control information contains a time control signal for the real-time synchronization between a still-picture signal and an audio signal.

The player in FIG. 25 operates on a DVD-Audio 110. The DVD-Audio 110 may be replaced by a DVD-Avd or another DVD-family disc. The player in FIG. 25 includes a drive unit 111 which is controlled by a drive control circuit 112. The drive unit 111 drives the DVD-Audio 110, and reads out a signal therefrom. The readout signal is subjected by a decoding and error correction circuit 113 to an EFM demodulation process and an error correction process, being converted into a bit stream signal. The bit stream signal except control data and DSI (data search information) data is stored into a track buffer 114 by a write control circuit 115. The control data in the bit stream signal is stored into a system buffer 117. The DSI data in the bit stream signal is stored into a DSI buffer 122. The DSI data are transmitted from the DSI buffer 122 to a DSI decoder 151. The DSI decoder 151 subjects the DSI data to a decoding process. The DSI decoder 151 outputs the decoding-resultant DSI signal.

A system controller 132 implements reproduction control in response to the control data in the system buffer 117. The system controller 132 includes a CPU which operates in accordance with a control program stored in an internal ROM. An operation unit 130, a display device 131, a system parameter memory 133, a system parameter memory 134, a general parameter memory 135, and a system timer 136 are connected to the system controller 132. The system parameter memory 133 includes a read/write memory. The system parameter memory 134 includes a read-only memory. The general parameter memory 135 includes a read/write memory.

The bit stream signal is read out from the track buffer 114 by a read control circuit 116. The readout bit stream signal is separated by a demultiplexer 128 into still-picture packs, real-time information packs, VBV packs, sub picture packs, VBI packs, and audio packs. The still-picture packs are stored into a still-picture buffer 147. The real-time information packs are stored into an RTI buffer 148. The VBV packs are stored into a VBV buffer 118. The sub picture packs are stored into a sub picture buffer 119. The VBI packs are stored into a VBI buffer 120. The audio packs are stored into an audio buffer 121.

The still-picture packs are transmitted from the still-picture buffer 147 to a still-picture decoder 149. The still-picture packs are decoded by the still-picture decoder 149 into a still-picture signal. The still-picture signal is outputted from the still-picture decoder 149.

The real-time information packs are transmitted from the RTI buffer 148 to an RTI decoder 150. The real-time information packs are decoded into an RTI signal by a combination of the RTI decoder 150 and a buffer 150A. The RTI decoder 150 outputs the RTI signal.

The VBV packs are transmitted from the VBV buffer 118 to a video decoder 123. The VBV packs are decoded by the video decoder 123 into a video signal. The video signal is transmitted from the video decoder 123 to an adder 127 via a letter box converter 126.

The sub picture packs are transmitted from the sub picture buffer 119 to a sub picture decoder 124. The sub picture packs are decoded by the sub picture decoder 124 into a sub picture signal. The sub picture signal is outputted from the sub picture decoder 124 to the adder 127.

The VBI packs are transmitted from the VBI buffer 120 to a VBI decoder 125. The VBI packs are decoded by the VBI decoder 125 into a VBI signal. The VBI signal is outputted from the VBI decoder 125 to the adder 127.

The video signal, the sub picture signal, and the VBI signal are combined by the adder 127 into a composite video signal. The composite video signal is outputted from the adder 127.

The audio packs are transmitted from the audio buffer 121 to an audio decoder 129. The audio decoder 129 includes a combination of a deformatter 141, a buffer 141A, a channel separator 142, and D/A converters 144 and 145. The audio packs are decoded by the audio decoder 129 into analog audio signals. The analog audio signals are outputted from the audio decoder 129.

The deformatter 141 receives the audio packs from the audio buffer 121. The deformatter 141 and the buffer 141A cooperate to deformat the audio packs into a 2-channel digital audio signal (or a multiple-channel digital audio signal). The deformatter 141 outputs the 2-channel digital audio signal to the channel separator 142. The channel separator 142 divides the 2-channel digital audio signal into a left-channel digital audio signal and a right-channel digital audio signal. The channel separator 142 outputs the left-channel digital audio signal to the D/A converter 144. The channel separator 142 outputs the right-channel digital audio signal to the D/A converter 145. The D/A converter 144 changes the left-channel digital audio signal into a corresponding left-channel analog audio signal. The D/A converter 144 outputs the left-channel analog audio signal. The D/A converter 145 changes the right-channel digital audio signal into a corresponding right-channel analog audio signal. The D/A converter 145 outputs the right-channel analog audio signal.

What is claimed is:

1. An information recording medium comprising a recording area for an auxiliary signal, and a recording area for a main signal, the auxiliary-signal recording area and the main-signal recording area being successively arranged, the main-signal recording area storing first information, second information, and third information, the first information representing plural tunes including original tunes and bonus tunes, the second information including first interactive data representative of group order numbers (GRN) for separating the tunes into groups including a group having only ones among the original tunes and a group having only ones among the bonus tunes and implementing playback of the tunes group by group, the third information including second interactive data representative of a password for permitting the playback of the group having only ones among the bonus tunes.

2. An information recording medium as recited in claim 1, comprising a DVD wherein a total number of the groups is in a range from 2 to 9.

3. An apparatus for transmitting data via a communication medium, the data being of a structure for record on an information recording medium comprising a recording area for an auxiliary signal, and a recording area for a main signal, the auxiliary-signal recording area and the main-signal recording area being successively arranged, the main-signal recording area storing first information, second information, and third information, the first information representing plural tunes including original tunes and bonus tunes, the second information including first interactive data representative of group order numbers (GRN) for separating the tunes into groups including a group having only ones among the original tunes and a group having only ones among the bonus tunes and implementing playback of the tunes group by group, the third information including second interactive data representative of a password for permitting the playback of the group having only ones among the bonus tunes.

4. An apparatus for reproducing information from an information recording medium storing first information, second information, and third information, the first information representing plural tunes including original tunes and bonus tunes, the second information including first interactive data representative of group order numbers (GRN) for separating the tunes into groups including a group having only ones among the original tunes and a group having only ones among the bonus tunes and implementing playback of the tunes group by group, the third information including second interactive data representative of a password for permitting the playback of the group having only ones among the bonus tunes, the apparatus comprising:

means for receiving input interactive data;

means for deciding whether or not the input interactive data are equal to the second interactive data; and means for, when it is decided that the input interactive data are equal to the second interactive data, reproducing a portion of the first information and executing the playback of the group having only ones among the bonus tunes.

5. A recording medium storing a signal representative of a computer program for reproducing information from the information recording medium of claim 1, the computer program comprising the steps of:

receiving input interactive data;

deciding whether or not the input interactive data are equal to the second interactive data; and when it is decided that the input interactive data are equal to the second interactive data, reproducing a portion of the first information and executing the playback of the group having only ones among the bonus tunes.

6. A method of transmitting a signal via a communication medium, the signal being of a predetermined communication format and representing a computer program, for reproducing information from the information recording medium of claim 1, the computer program comprising the steps of:

receiving input interactive data;

deciding whether or not the input interactive data are equal to the second interactive data; and when it is decided that the input interactive data are equal to the second interactive data, reproducing a portion of the first information and executing the playback of the group having only ones among the bonus tunes.

7. An apparatus for transmitting a signal via a communication medium, the signal being of a predetermined communication format and representing a computer program for reproducing information from the information recording medium of claim 1, the computer program comprising the steps of:

receiving input interactive data;

deciding whether or not the input interactive data are equal to the second interactive data; and when it is decided that the input interactive data are equal to the second interactive data, reproducing a portion of the first information and executing the playback of the group having only ones among the bonus tunes.

8. A medium for transmitting a signal of a predetermined communication format, the signal representing a computer program for reproducing information from the information recording medium of claim 1, the computer program comprising the steps of:

receiving input interactive data;

deciding whether or not the input interactive data are equal to the second interactive data; and when it is decided that the input interactive data are equal to the second interactive data, reproducing a portion of the first information and executing the playback of the group having only ones among the bonus tunes.

* * * * *

UNITED STATES PATENT AND TRADEMARK OFFICE
CERTIFICATE OF CORRECTION

PATENT NO. : 6,782,192 B1  
APPLICATION NO. : 09/521774  
DATED : August 24, 2004  
INVENTOR(S) : Yoshiaki Tanaka et al.

It is certified that error appears in the above-identified patent and that said Letters Patent is hereby corrected as shown below:

TITLE PAGE, ITEM (54) TITLE SHOULD READ:  
(54)  RECORDING MEDIUM, APPARATUS AND METHOD RELATED TO INFORMATION REPRESENTING TUNES

Signed and Sealed this

Ninth Day of October, 2007

JON W. DUDAS  
*Director of the United States Patent and Trademark Office*